(12) United States Patent
Esteban et al.

(10) Patent No.: US 11,494,978 B2
(45) Date of Patent: Nov. 8, 2022

(54) COMPUTER VISION SYSTEMS AND METHODS FOR MODELING THREE-DIMENSIONAL STRUCTURES USING TWO-DIMENSIONAL SEGMENTS DETECTED IN DIGITAL AERIAL IMAGES

(71) Applicant: Insurance Services Office, Inc., Jersey City, NJ (US)

(72) Inventors: Jose Luis Esteban, Madrid (ES); Raul Cabido, Madrid (ES); Francisco Rivas, Madrid (ES)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 16/458,710

(22) Filed: Jul. 1, 2019

(65) Prior Publication Data

US 2020/0005536 A1    Jan. 2, 2020

Related U.S. Application Data

(60) Provisional application No. 62/691,869, filed on Jun. 29, 2018.

(51) Int. Cl.
*G06T 17/20* (2006.01)
*G06T 17/10* (2006.01)
(Continued)

(52) U.S. Cl.
CPC ............ *G06T 17/10* (2013.01); *G06F 9/3891* (2013.01); *G06T 15/205* (2013.01); *G06T 17/20* (2013.01); *G06V 20/13* (2022.01); *G06V 20/647* (2022.01)

(58) Field of Classification Search
CPC .......... G06T 17/20; G06T 7/55; G06T 7/564; G06T 7/593; G06T 7/596; G06K 9/00637
See application file for complete search history.

(56) References Cited

U.S. PATENT DOCUMENTS

| 2007/0110338 A1* | 5/2007 | Snavely | ................... G06K 9/32 382/305 |
| 2013/0083990 A1* | 4/2013 | Stone | .................... G06T 15/205 382/141 |

(Continued)

OTHER PUBLICATIONS

International Search Report of the International Searching Authority dated Sep. 20, 2019, issued in connection with International Application No. PCT/US2019/40092 (3 pages).

(Continued)

*Primary Examiner* — Ryan McCulley
(74) *Attorney, Agent, or Firm* — McCarter & English, LLP

(57) ABSTRACT

A system for modeling a three-dimensional structure utilizing two-dimensional segments comprising a memory and a processor in communication with the memory. The processor extracts a plurality of two-dimensional segments corresponding to the three-dimensional structure from a plurality of images indicative of different views of the three-dimensional structure. The processor determines a plurality of three-dimensional candidate segments based on the extracted plurality of two-dimensional segments and adds the plurality of three-dimensional candidate segments to a three-dimensional segment cloud. The processor transforms the three-dimensional segment cloud into a wireframe indicative of the three-dimensional structure by performing a wireframe extraction process on the three-dimensional segment cloud.

21 Claims, 21 Drawing Sheets

3D Segment Clouds Before the Outlier Removal Process

3D Segment Clouds After the Outlier Removal Process

(51) Int. Cl.
  *G06F 9/38*   (2018.01)
  *G06T 15/20*  (2011.01)
  *G06V 20/13*  (2022.01)
  *G06V 20/64*  (2022.01)

(56) References Cited

U.S. PATENT DOCUMENTS

| | | |
|---|---|---|
| 2013/0300740 A1 | 11/2013 | Snyder et al. |
| 2014/0293016 A1 | 10/2014 | Benhimane et al. |
| 2015/0347872 A1* | 12/2015 | Taylor .................. G06K 9/3233 382/224 |
| 2016/0150217 A1 | 5/2016 | Popov |
| 2018/0053347 A1 | 2/2018 | Fathi et al. |
| 2018/0139431 A1 | 5/2018 | Simek et al. |

OTHER PUBLICATIONS

Written Opinion of the International Searching Authority dated Sep. 20, 2019, issued in connection with International Application No. PCT/US2019/40092 (5 pages).

Jain, et al., "Exploiting Global Connectivity Constraints for Reconstruction of 3D Line Segments from Images," 2010 IEEE Conference on Computer Vision and Pattern Recognition, Jun. 2010 (8 pages).

Extended European Search Report dated Jul. 22, 2021, issued by the European Patent Office issued in connection with European Patent Application No. 19825640.6 (7 pages).

* cited by examiner

2 Views of the Optimized 3D Segment Cloud

COMPUTER VISION SYSTEMS AND METHODS FOR MODELING THREE-DIMENSIONAL STRUCTURES USING TWO-DIMENSIONAL SEGMENTS DETECTED IN DIGITAL AERIAL IMAGES

RELATED APPLICATIONS

This application claims priority to United States Provisional Patent Application Ser. No. 62/691,869 filed on Jun. 29, 2018, the entire disclosure of which is hereby expressly incorporated by reference.

BACKGROUND

Technical Field

The present disclosure relates generally to the field of computer modeling of structures and property. More specifically, the present disclosure relates to computer visions systems and methods for modeling three dimensional ("3D") structures using two-dimensional segments detected in digital aerial images.

RELATED ART

Accurate and rapid identification and depiction of objects from digital images (e.g., aerial images, satellite images, ground-based images, etc.) is increasingly important for a variety of applications. For example, information related to the roofs of buildings is often used by construction professionals to specify materials and associated costs for both newly-constructed buildings, as well as for replacing and upgrading existing structures. Further, in the insurance industry, accurate information about structures may be used to determining the proper costs for insuring buildings/structures. Still further, government entities can use information about the known objects in a specified area for planning projects such as zoning, construction, parks and recreation, housing projects, etc.

Various software systems have been implemented to process aerial images to identify a set of 2D segments and generate a 3D model of a structure. Key point detectors may yield numerous key point candidates that must be matched against other key point candidates from different images. This approach can be used successfully on aerotriangulation (camera calibration) problems, where only the camera parameters need to be optimized. However, finding a sufficient quantity of corresponding points from which one can infer a 3D structure is not computationally practical.

Another approach is the creation of point clouds from multiple images followed by the detection of planes. In order for this approach to work well, an excellent camera calibration is required. Otherwise, the necessary averaging needed to cope with the inherent noise softens the resulting point clouds, especially on edges which are the most important features.

Alternatively, the detection of line segments on 2D images is a robust procedure that can be performed using well known techniques like the Hough transform, the line segment detector (LSD) or, more recently, neural networks. These networks can be trained to detect the kind of 2D segments that are relevant for structures like buildings, thus preventing confusion with ground segments and other property features which are visible in the images. In addition, a collection of detected segments is more manageable than a collection of points because of the smaller number of elements. It also allows the elements to be defined in more dimensions, which permits classifying segments by slope, orientation, and other classifying characteristics.

Thus, in view of existing technology in this field, what would be desirable is a system that automatically and efficiently processes digital images, regardless of the source, to automatically detect and generate a model of a 3D structure represented by a set of 3D segments. Accordingly, the computer vision systems and methods disclosed herein solve these and other needs.

SUMMARY

This present disclosure relates to computer vision systems and methods for modeling a 3D structure based on two-dimensional 2D segments derived in digital aerial images. Aerial image sources could include, but are not limited to, aerial imagery, satellite imagery, ground-based imagery, imagery taken from unmanned aerial vehicles (UAVs), mobile device imagery, etc. The detected 2D segments can correspond to, roofs, sidewalks, building structures, pools edges, concrete flatwork, property structural features (structures, buildings, pergolas, gazebos, terraces, retaining walls, and fences), sports courts, cereal boxes, furniture, machinery and other objects. The system can generate a 3D segment cloud from the 2D segments. In particular, a set of views of the same 3D structure may be provided to the system of the present disclosure. Each view is characterized by a camera pose (a set of camera parameters) and a projection plane. A set of detected 2D segments may lie on the projection plane and may be associated with each view. The present disclosure describes methods for calculating and outputting a set of 3D segments that represent the most likely edges of the original 3D object based on 2D segments detected from the images.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to computer vision systems and methods for modeling three-dimensional ("3D") structures using two-dimensional ("2D") segments detected in digital aerial images, as described in detail below in connection with FIGS. 1-21.

Figure 1:
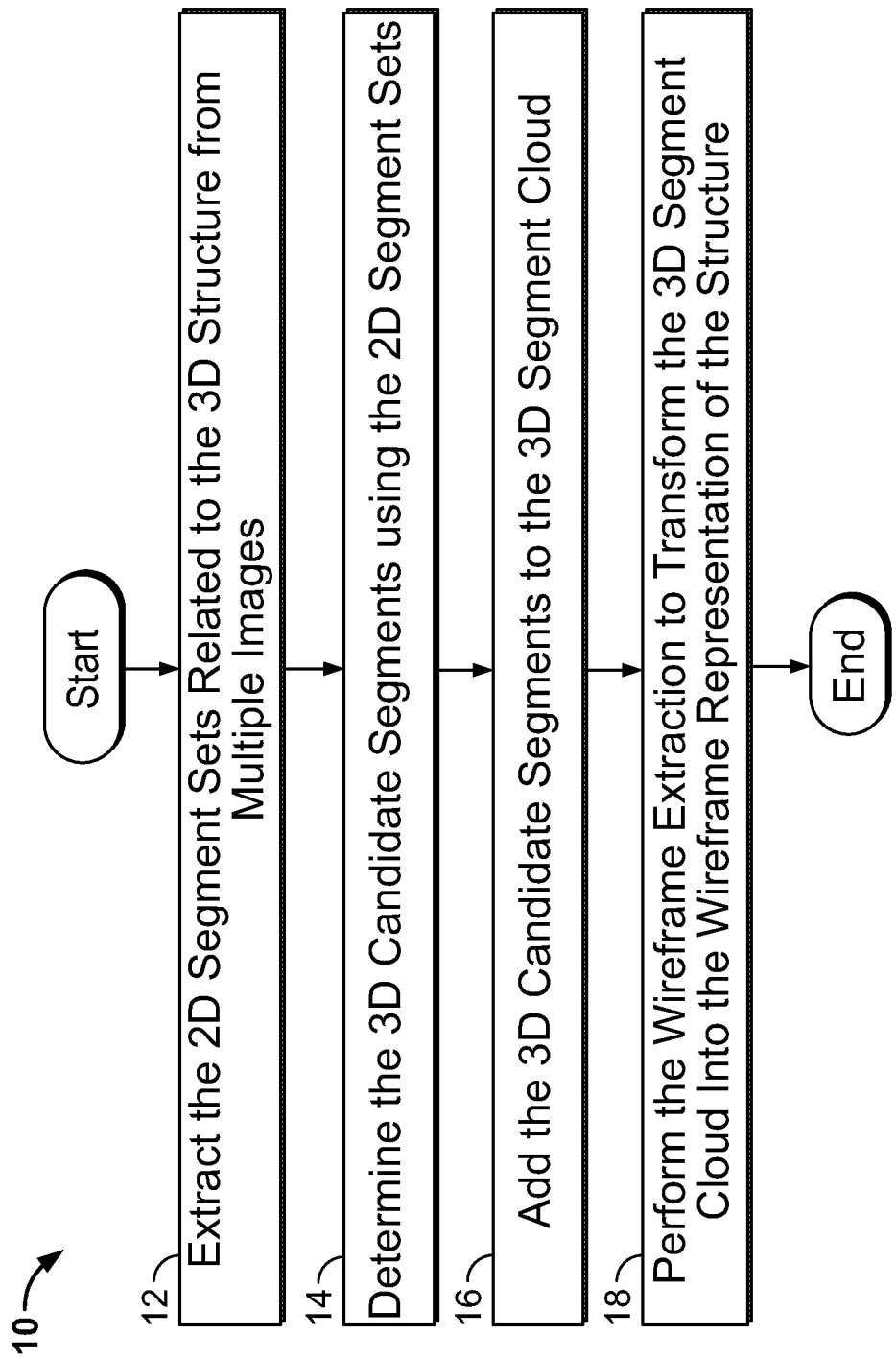
FIG. 1 is a flowchart illustrating overall process steps carried out by the system of the present disclosure.

FIG. 1 is a flowchart illustrating the overall process steps carried out by the system, indicated generally at 10. In step 12, the system extracts 2D segment sets that are related to a 3D structure from multiple images. Specifically, each 2D segment set extracted from each image may include one or more 2D segments. As mentioned above, the images may be digital images such as aerial images, satellite images, ground based images, etc. However, those skilled in the art would understand that any type of images (e.g., photograph, scan, etc.) can be used. It should be noted that the images can be taken by cameras whose intrinsic and extrinsic parameters may be known for each image. The different methods that can be used to detect 2D segments in images are well known, present in a variety of technical literature, and are not specific to this system.

In step 14, the system determines 3D candidate segments using the 2D segment sets. Next, in step 16, the system adds the 3D candidate segments to a 3D segment cloud. The 3D segment cloud could include multiple 3D segment candidates that can be further filtered as disclosed below. Finally, in step 18, the system performs a wireframe extraction to transform the 3D segment cloud into a wireframe representation of the structure.

The process steps of the invention disclosed herein could be embodied as computer-readable software code executed by one or more computer systems, and could be programmed using any suitable programming languages including, but not limited to, C, C++, C#, Java, Python or any other suitable language. Additionally, the computer system(s) on which the present disclosure may be embodied includes, but is not limited to, one or more personal computers, servers, mobile devices, cloud-based computing platforms, etc., each having one or more suitably powerful microprocessors and associated operating system(s) such as Linux, UNIX, Microsoft Windows, MacOS, etc. Still further, the invention could be embodied as a customized hardware component such as a field-programmable gate array ("FPGA"), application-specific integrated circuit ("ASIC"), embedded system, or other customized hardware component without departing from the spirit or scope of the present disclosure.

Figure 2:
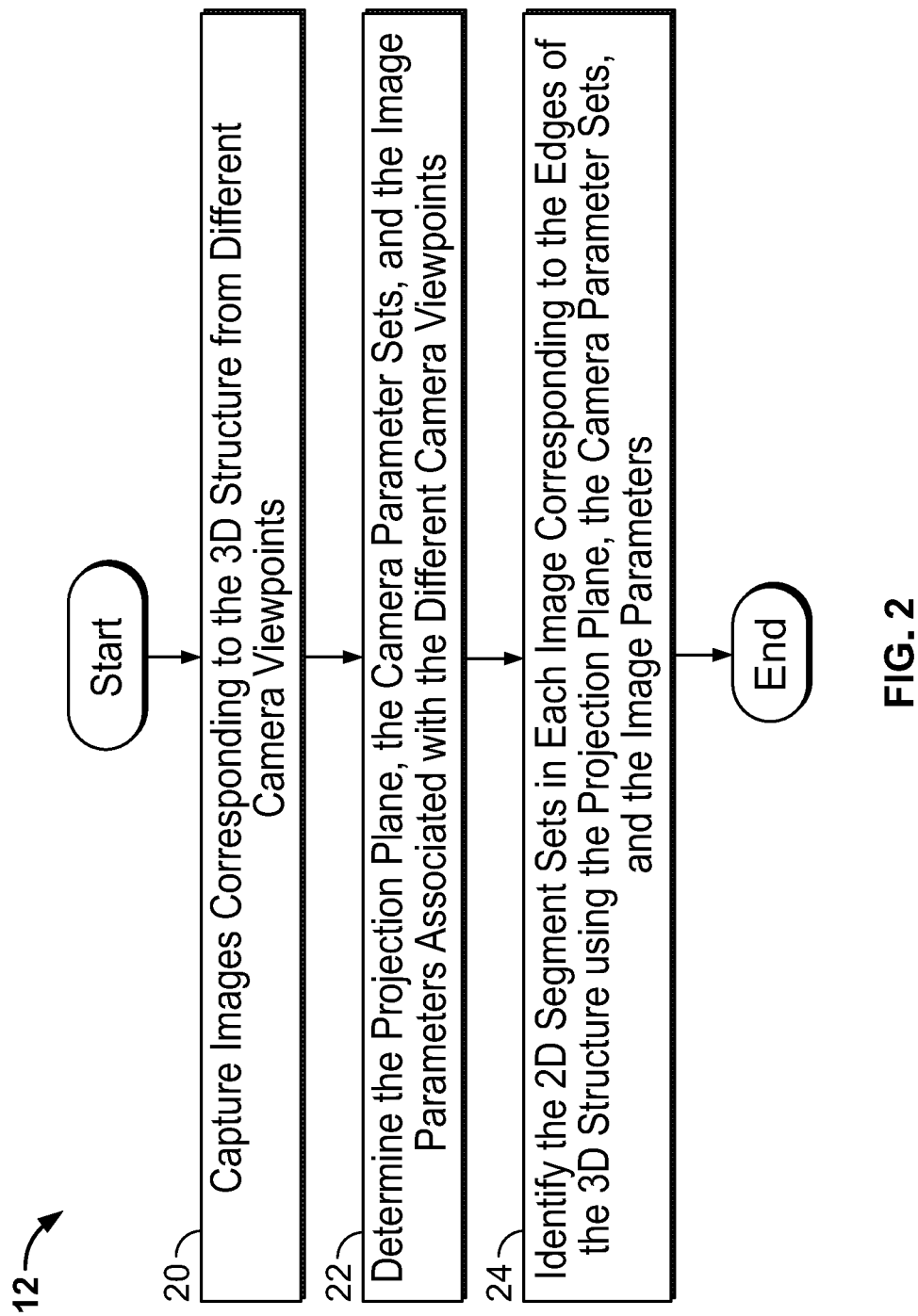
FIG. 2 is a flowchart illustrating step 12 of FIG. 1 in greater detail.
Figure 3A:
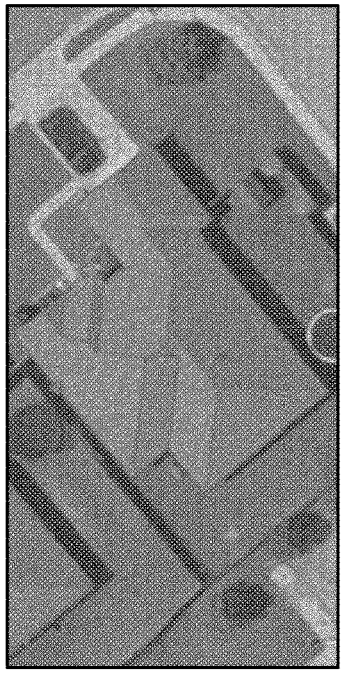
FIGS. 3A-3E are screenshots illustrating a 3D structure (a house) and respective 2D segment sets detected.
Figure 3B:
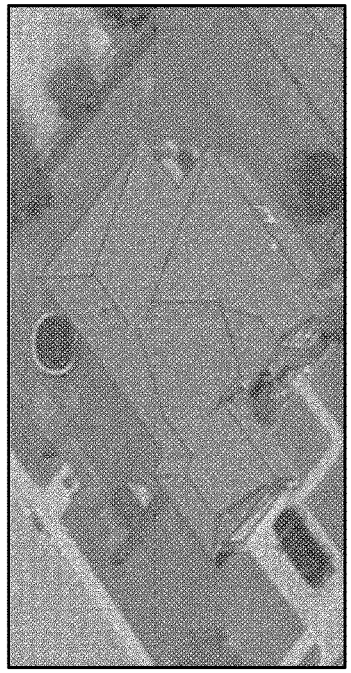
Figure 3C:
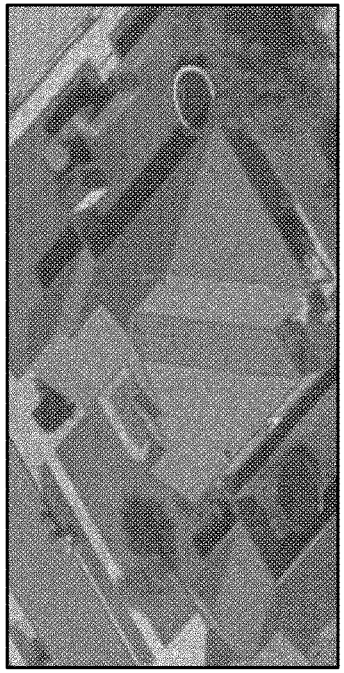
Figure 3D:
Figure 3E:
Figure 4:
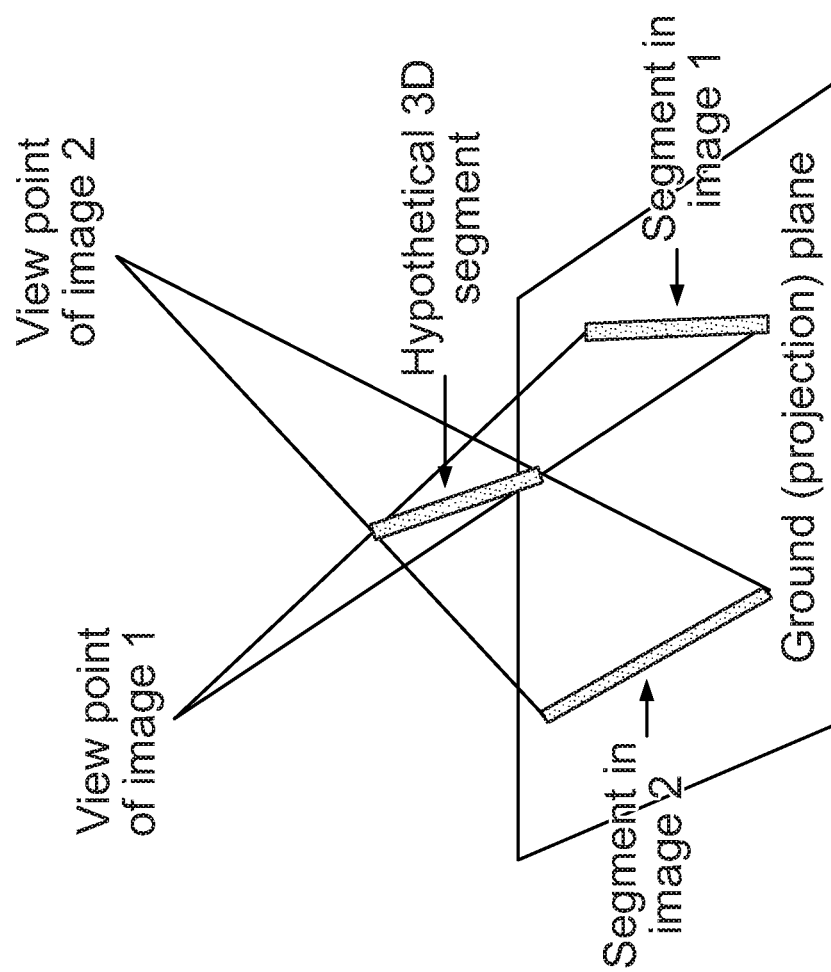
FIG. 4 is a diagram illustrating 2D segments being projected onto a ground plane and generation of a hypothetical 3D segment based on the projections.

FIG. 2 shows a flowchart illustrating step 12 of FIG. 1 in greater detail. In particular, FIG. 2 illustrates process steps for extracting the 2D segment sets related to the 3D structure from the images. In step 20, the system captures the images corresponding to the 3D structure from different camera viewpoints ("views"). For example, a drone could capture a first aerial image of the 3D structure from a first location and a second aerial image of the 3D structure from a second location. The first aerial image could be taken from a first viewpoint and the second aerial image could be taken from a second viewpoint. In step 22, the system determines a projection plane, camera parameter sets, and image parameters that are associated with the different camera viewpoints (e.g., the first viewpoint and the second viewpoint). Next, in step 24, the system identifies the 2D segment sets in each image (e.g., the first aerial image and the second aerial image) corresponding to the edges of the 3D structure by using the projection plane, the camera parameter sets, and the image parameters.

FIG. 3A-3E are screenshots illustrating a 3D structure (in this case, a house) and respective 2D segment sets detected by the system and corresponding to the 3D structure. It should be understood that each 2D segment in the 2D segment sets identified in each image is a projection of a certain 3D edge on a ground plane, as seen from the image's observation point. Each 2D segment can then be converted to world coordinates using the camera parameters and the ground plane. The set of 2D segments represented in world coordinates on the ground plane can then be used to determine the 3D segments, each 2D segment set being associated with a known 3D camera position.

Figure 5B:
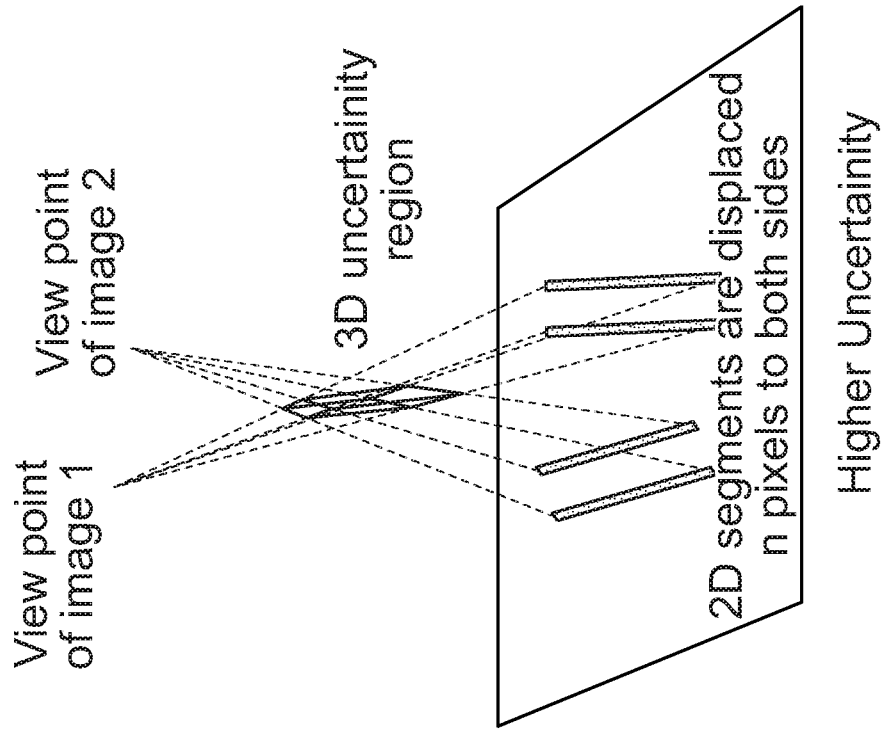
FIGS. 5A-5B are diagrams illustrating how to estimate 3D uncertainty regions starting from a 2D uncertainty value.
Figure 5A:
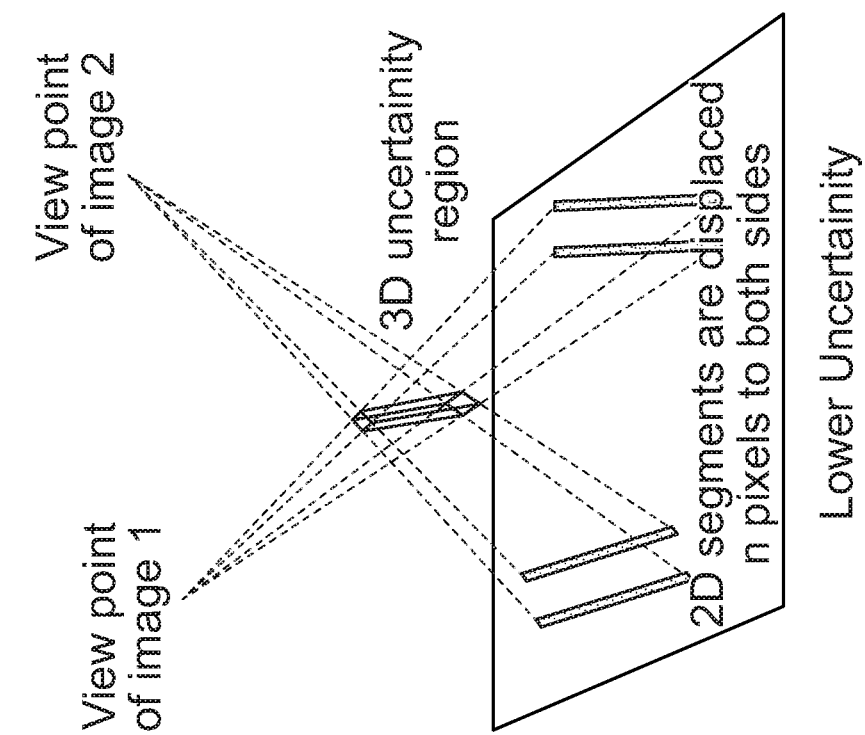

For any pair of images where the same edge is projected, the 3D line containing the edge may be reconstructed from the crossing of two planes, each one defined by the segment projected on the ground and the observation point. This can be seen in FIG. 4. It should be understood that the use of two images (the first aerial image and the second aerial image) is only by way of example, and that many images could be used. Depending on the position of 2D segments, the camera position and the image resolution, an uncertainty of whether a correct 3D segment was determined from the 2D segments can be detected. This is illustrated in FIGS. 5A and 5B, where each detected segment is laterally displaced a number of pixels to both sides to create a 2D uncertainty area. The 2D uncertainty area determines a 3D uncertainty volume, as illustrated in FIGS. 5A and 5B.

Figure 6:
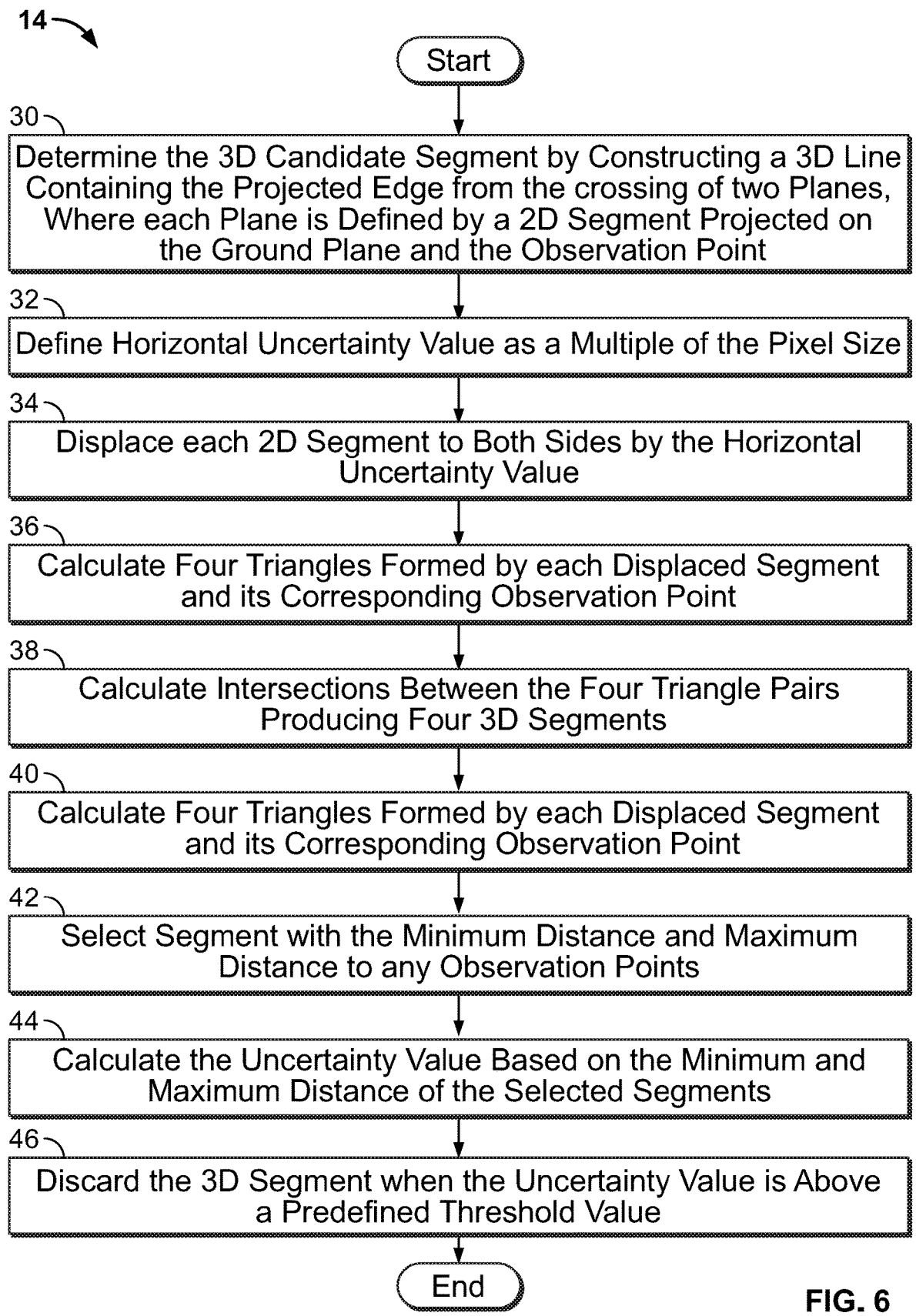
FIG. 6 is a flowchart illustrating step 14 of FIG. 1 in greater detail.

FIG. 6 is a flowchart illustrating step 14 of FIG. 1 in greater detail, wherein the system determines 3D candidate segments and discards 3D segments with a high uncertainty value. In step 30, the 3D candidate segment is determined by constructing a 3D line containing the projected edge from the crossing of two planes, where each plane is defined by a 2D segment projected on the ground plane and the observation point. In step 32, a horizontal uncertainty value is defined as a multiple of pixel size. For example, the horizontal uncertainty value could be defined as two pixels of the image. In step 34, each 2D segment is displaced to both sides by the horizontal uncertainty value. In step 36, four triangles, which are formed by each displaced 2D segment and its corresponding observation point, are calculated. In step 38, intersections between the four triangle pairs are calculated to produce four 3D segments. In step 42, the system selects a 3D segment with a minimum distance and a 3D segment with a maximum distance to any of the observation points. In step 44, the uncertainty value is calculated based on the minimum and the maximum distance of the selected 3D segments. For example, the uncertainty value may be calculated to be the distance between the minimum distance and the maximum distance. In step 46, the uncertainty value is compared to a predetermined threshold value and, when the uncertainty value is above the predetermined threshold value, the 3D segment is discarded. Operation of the processing steps of FIG. 6 for determining the 3D uncertainty regions (e.g., regions with lower uncertainty and higher uncertainty) are illustrated in FIGS. 5A and 5B, for reference.

Combining random pairs of 2D segments, each from a different view, may yield multiple random and irrelevant 3D segments. As such, it is desirable to determine which pairs of 2D segments in the views infer the 3D segment in the original structure. One way of doing so is referred to herein as "cluster-based 3D segment detection." A second way of doing so is referred to herein as "epipolar-based 3D segment detection." The cluster-based 3D segment detection and the epipolar-based 3D segment detection could be performed in step 14 of FIG. 1.

Figure 7:
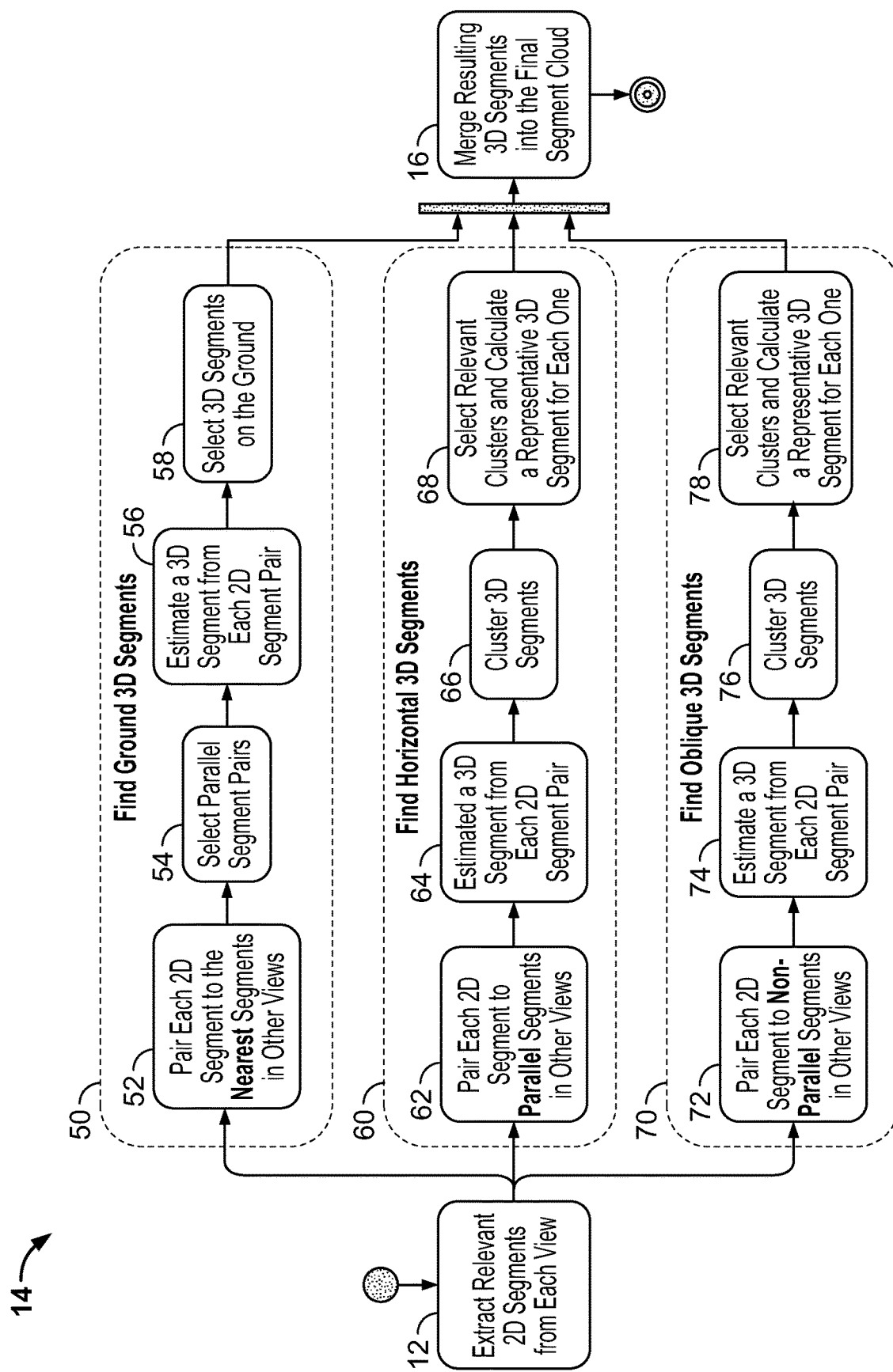
FIG. 7 is a flowchart illustrating step 14 of FIG. 1 in greater detail.
Figure 9:
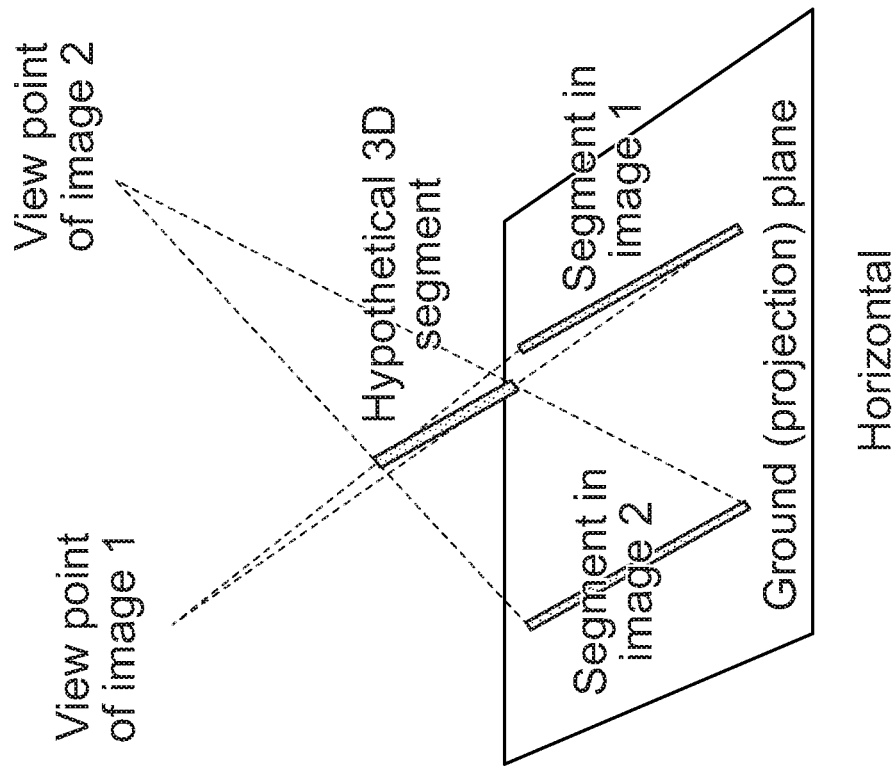
FIGS. 8-10 are diagrams illustrating generation of a hypothetical 3D segment through projection of segments onto a ground plane under different circumstances.
Figure 8:
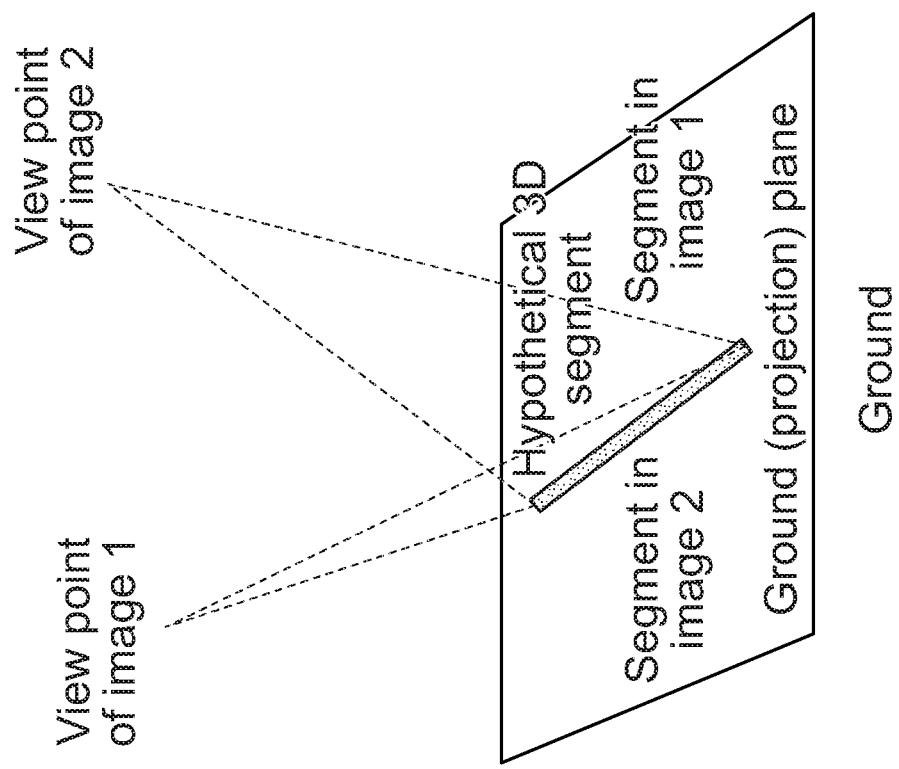
Figure 10:
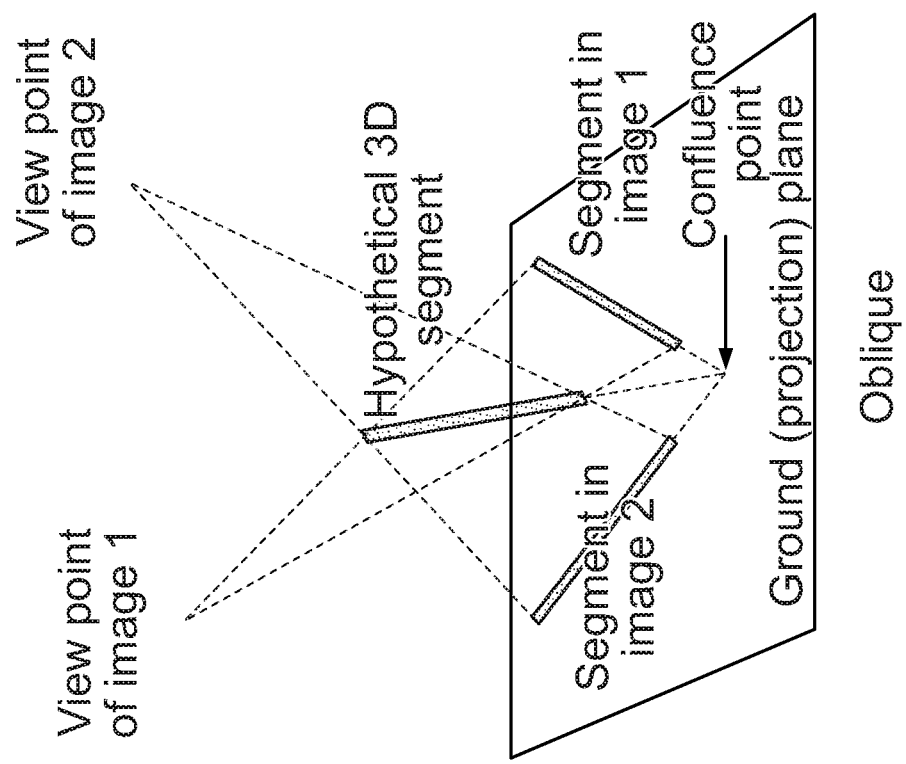

FIG. 7 is a flowchart illustrating step 14 of FIG. 1 in greater detail. It should first be noted that when the 3D segments are projected on the ground plane (e.g., a horizontal plane) from different observation points, the following can be observed. First, the projections which are equal from different observation points correspond to lines on the ground, as illustrated in FIG. 8. Second, horizontal 3D-lines yield parallel projections, as illustrated in FIG. 9. Third, oblique 3D-lines yield projections which intersect at the same point where the 3D-line crosses the ground plane, as illustrated in FIG. 10. Therefore, the correspondence between lines in different images can be segmented into: 1) determining ground lines by detecting equivalent projections, 2) determining horizontal lines by clustering segments using an angle threshold in order to obtain parallel clusters, and 3) determining oblique lines by calculating intersections between each crossing line pair and clustering the resulting intersection points.

As noted above, in step 12, 2D segment sets related to the 3D structure from multiple images are extracted. The 2D segment sets are then be processed through three parallel operations. The first operation 50 determines ground 3D segments. Specifically, in step 52, the first operation 50 pairs each 2D segment to the nearest 2D segment in other views. The pairing could be performed using a fast approach (e.g., using the "FLANN" algorithm), but of course, those skilled in the art understand that other approaches may be used. In step 54, the first operation 50 selects the 2D segment pairs which are parallel, close to each other, and have a minimum degree of overlap. In step 56, the first operation 50 estimates the 3D segment from each pair of the 2D segments. The estimation includes: 1) calculating the triangles formed by each 2D segment and its corresponding observation point, 2) calculating the 3D segment resulting from the intersection of both triangles, 3) discarding the 3D segment when there is no intersection of the triangles, 4) discarding the 3D segment when a slope of the 3D segment is above the predetermined threshold value, 5) discarding the 3D segment when the uncertainty value of the 3D segment is above a predetermined threshold value (as discussed above in connection with FIGS. 5, and 6) determining whether the 3D segment lies on the ground (e.g., a ground height lies between a high and a low height) and discarding the 3D segment if the 3D segment does not lie on the ground. In step 58, the first operation 50 selects the remaining 3D segments which were determined to be on the ground in step 56. Operation of the process 50 is illustrated by the diagram of FIG. 8.

Returning back to FIG. 7, the second operation 60 determines horizontal 3D segments. Specifically, in step 62, the second operation 60 pairs each 2D segment in each view to roughly parallel segments in other views (e.g., the 2D segments that form an angle which is less that a predetermine angle). In step 64, the second operation 60 estimates the 3D segment from each pair of the parallel 2D segments. Such estimation could include: 1) calculating the triangles formed by each 2D segment and its corresponding observation point, 2) calculating the 3D segment resulting from the intersection of both triangles, and 3) discarding the pair when any of the following conditions occur: (a) there is no 3D segment, (b) a slope of the 3D segment slope is above a predetermined threshold value, (c) a length of the 3D segment is smaller by a predetermined amount than a length of a smallest 2D segment, (d) an end of the 3D segment is determined to be too close to the ground or too high for practical purposes, or (e) the uncertainty value of the 3D segment is above the predetermined threshold value (as discussed above in connection with FIGS. 5 and 6). In step 66, the second operation 60 clusters the remaining 3D segments. The clustering process can consider the distance, angle, length, etc. of the remaining 3D segments when clustering is performed. In step 68, the second operation 60 selects a subset of the clusters (e.g., the clusters composed of a minimum number of segments) and determines the representative segment (e.g., the segment closest to the cluster's centroid). FIG. 9 illustrates operation of operation 60 of FIG. 7.

Returning back to FIG. 7, the third operation 70 determines oblique 3D segments. Specifically, in step 72, the third operation 70 pairs each 2D segment in each view with non-parallel segments in other views (e.g., the 2D segments that form an angle greater that a predetermine angle). In step 74, the second operation 70 estimates 3D segments from pairs of 2D segments by determining the crossing point of the lines of each pair of segments in the 2D segment set. Such estimation could include: 1) discarding the pair of 2D segments when the crossing point is not located within the area where the resulting 2D segments are expected to be found, 2) calculating the triangles formed by each 2D segment and a corresponding observation point of each 2D segment, 3) calculating the 3D segment resulting from the intersection of both triangles, and 4) discarding the pair of 2D segments when any of the following occur: (a) no 3D segment is determined, (b) a length of the 3D segment is smaller (by a predetermined value) than the length of the smallest 2D segment, (c) an end of the 3D segment is too close to the ground or too high for practical purposes, both determined by a predetermined value, or (d) the uncertainty value of the 3D segment is above the predetermined threshold value (as discussed above in the method of FIG. 5). In step 76, the third operation clusters the remaining 3D segments. The clustering could consider the distance, angle, length, etc. of the remaining 3D segments. In step 78, the third operation selects relevant clusters (e.g., those composed of a minimum number of segments) and determine the representative segment (e.g., the segment closest to the cluster's centroid). Operation 70 is also illustrated in FIG. 10.

Finally, in step 16, the 3D segment cloud is generated by combining the segments determined in the first, second and third operation 50, 60, 70.

Figure 11:
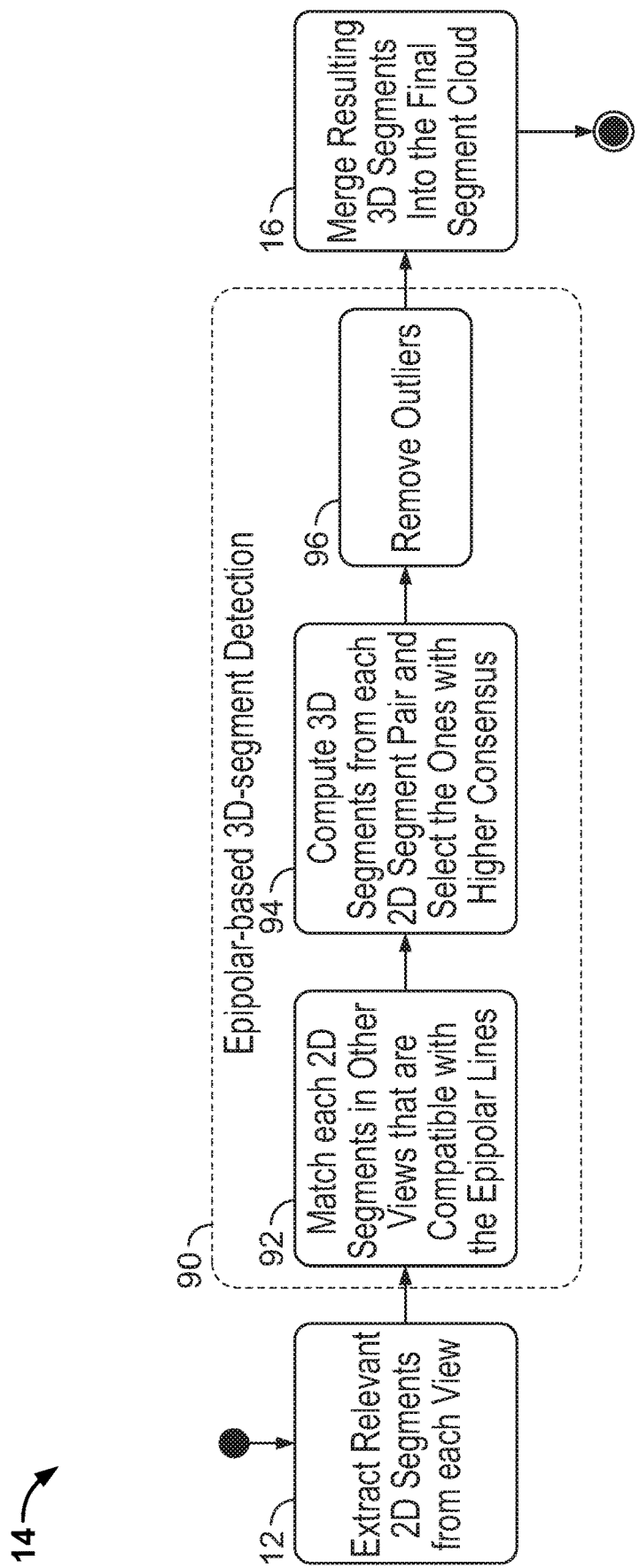
FIG. 11 is a flowchart illustrating step 14 of FIG. 1 in greater detail.

FIG. 11 is a flowchart illustrating step 14 of FIG. 1 in greater detail, wherein the system uses a epipolar-based 3D segment detection. Epipolar-based 3D segment detection is indicated generally as a fourth operation 90. The epipolar-based 3D segment detection can use epipolar lines to reduce a number of comparisons between the 2D segments, thereby reducing computational complexity and processing time required by the computer vision system. In step 12, the 2D segment sets that are related to the 3D structure from multiple images are extracted. In step 92, the fourth operation 90 matches the 2D segments in other views that are compatible with the epipolar lines. In step 94, the fourth operation 90 computes the 3D segments from each of the 2D segment pairs and selects the 3D segment pairs with a consensus above a predetermined threshold value. For example, step 94 can be performed using a sample-consensus-based approach. In step 96, the fourth operation 90 removes outlier 3D segments. In step 16, the 3D segment cloud may be generated by merging the resulting 3D segments.

Figure 12:
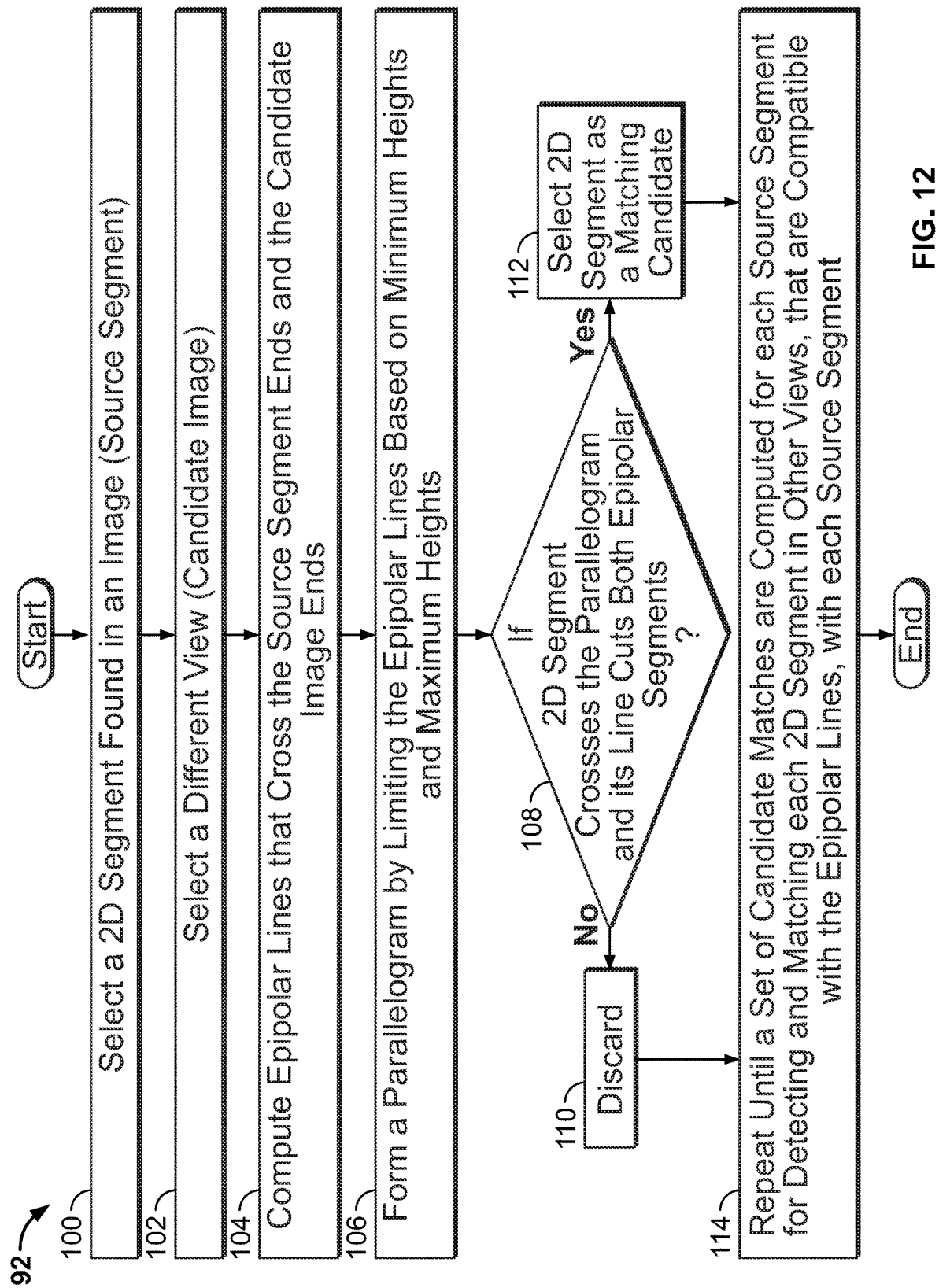
FIG. 12 is a flowchart illustrating step 92 of FIG. 11 in greater detail.

FIG. 12 a flowchart illustrating step 92 of FIG. 11 in greater detail. In step 100, the system selects a 2D segment found in the image (e.g., source segment) of the 3D structure. In step 102, the system selects a different view (e.g., candidate image) of the 3D object. In step 104, the system computes the epipolar lines relating to both images that cross the ends of the source segment. In step 106, the system calculates a parallelogram by limiting the epipolar lines based on minimum heights and maximum heights.

Figure 13B:
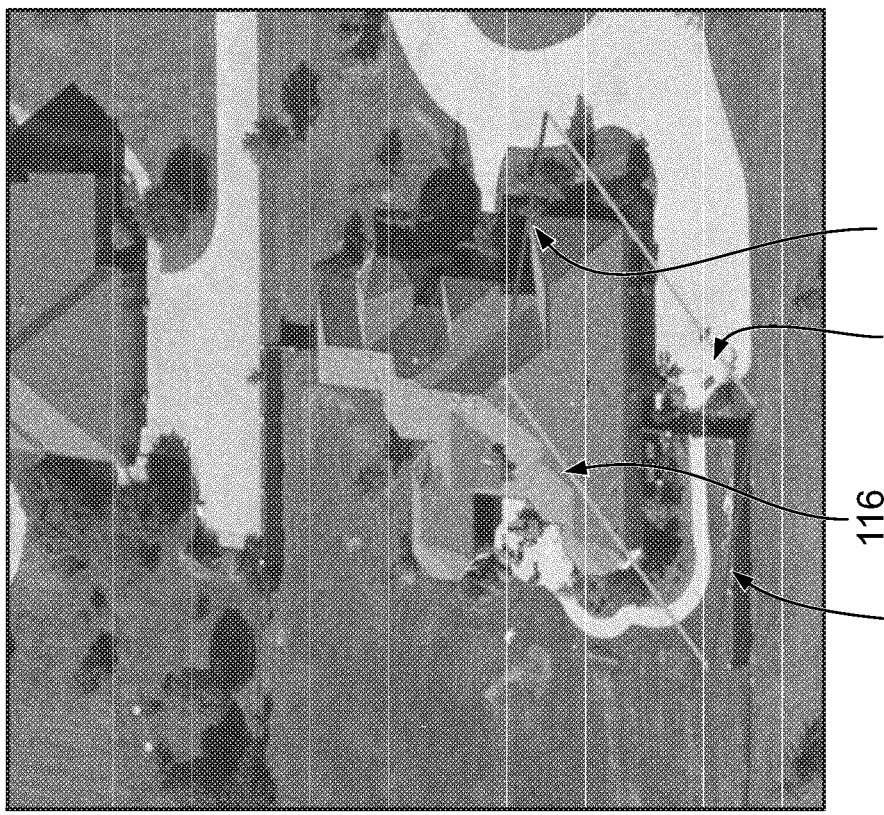
FIGS. 13A-13B are screenshots illustration detection by the system of potential 2D segments corresponding to a 3D structure (a house) using epipolar-based segment detection.
Figure 13A:

FIGS. 13A and 13B illustrates potential candidates being detected by the processes steps 100, 102, 104 and 106. Specifically, FIG. 13A shows the source image with the detected 2D segment (e.g., source segment). FIG. 13B shows the parallelogram formed by the two epipolar lines 116 and the minimum and maximum heights 117, together with a set of candidate segments lying inside the parallelogram.

Returning to FIG. 12, in step 108, the system determines whether the 2D segment crosses the parallelogram and whether the 2D segment cuts both epipolar segments. If not, then the 2D segment is discarded in step 110. Otherwise, the 2D segment is selected as a matching candidate in step 112. In step 114, the foregoing process steps are repeated until a set of candidate matches are computed for the source segment against each other view. The result may be a set of 2D segment match candidates for the source segment. It should be understood that many of the match candidates may be false positive matches. These false positive matches may be filtered out in steps 94 and 96 of FIG. 11. Once all candidate matches are computed for a source segment, the process is repeated for the rest of the available source segments. At the end of the process, every 2D segment detected in a first view will be associated with a set of candidate matches from other views.

Figure 14:
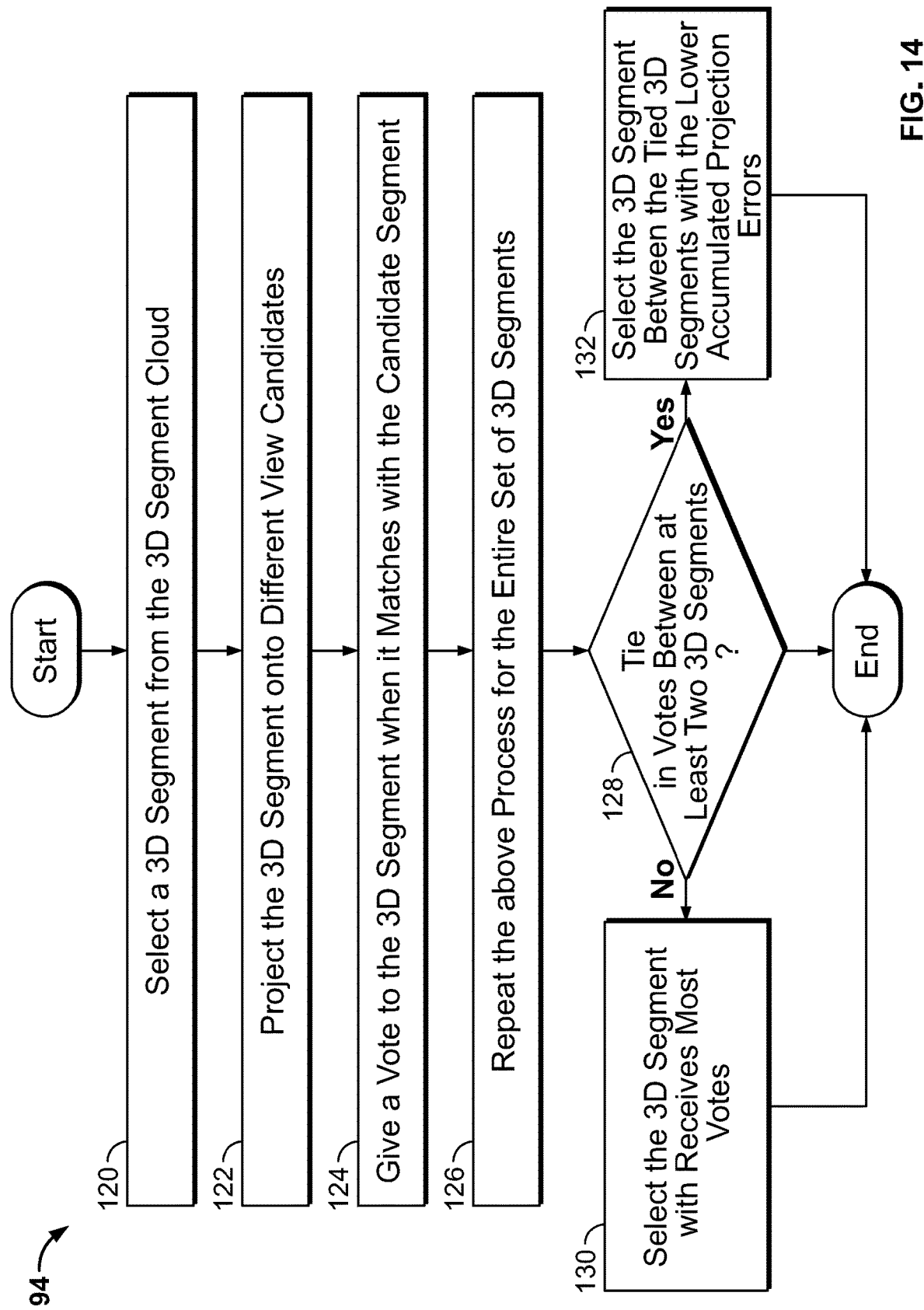
FIG. 14 is a flowchart illustrating step 94 of FIG. 11 in greater detail.

FIG. 14 is a flowchart illustrating step 94 of FIG. 11 in greater detail, wherein 3D segment computation is performed using a sample-consensus-based approach. It should be understood that each 2D segment pair (source-segment, candidate-segment) may generate the 3D segments using the methods discussed above. Further, the 3D segment candidates may be stored in the 3D segment cloud. In step 120, a 3D segment is selected from the 3D cloud. In step 122, the 3D segment is projected onto different view candidates. In step 124, a vote is given by the system to the 3D segment when it matches with a candidate segment in the different view candidates. In step 126, the process discussed in steps 120, 122, and 124 is repeated for the entire set of 3D segment in the 3D cloud. Next, in step 128, the system determines whether any of the 3D segments are tied in votes. If there is no tie, in step 130, the 3D segment with the most votes is selected. If there is a tie in votes between at least two 3D segments, in step 132, the 3D segment (among the tied 3D segments) that has the lower accumulated projection errors is selected.

Figures 15A, 15B:
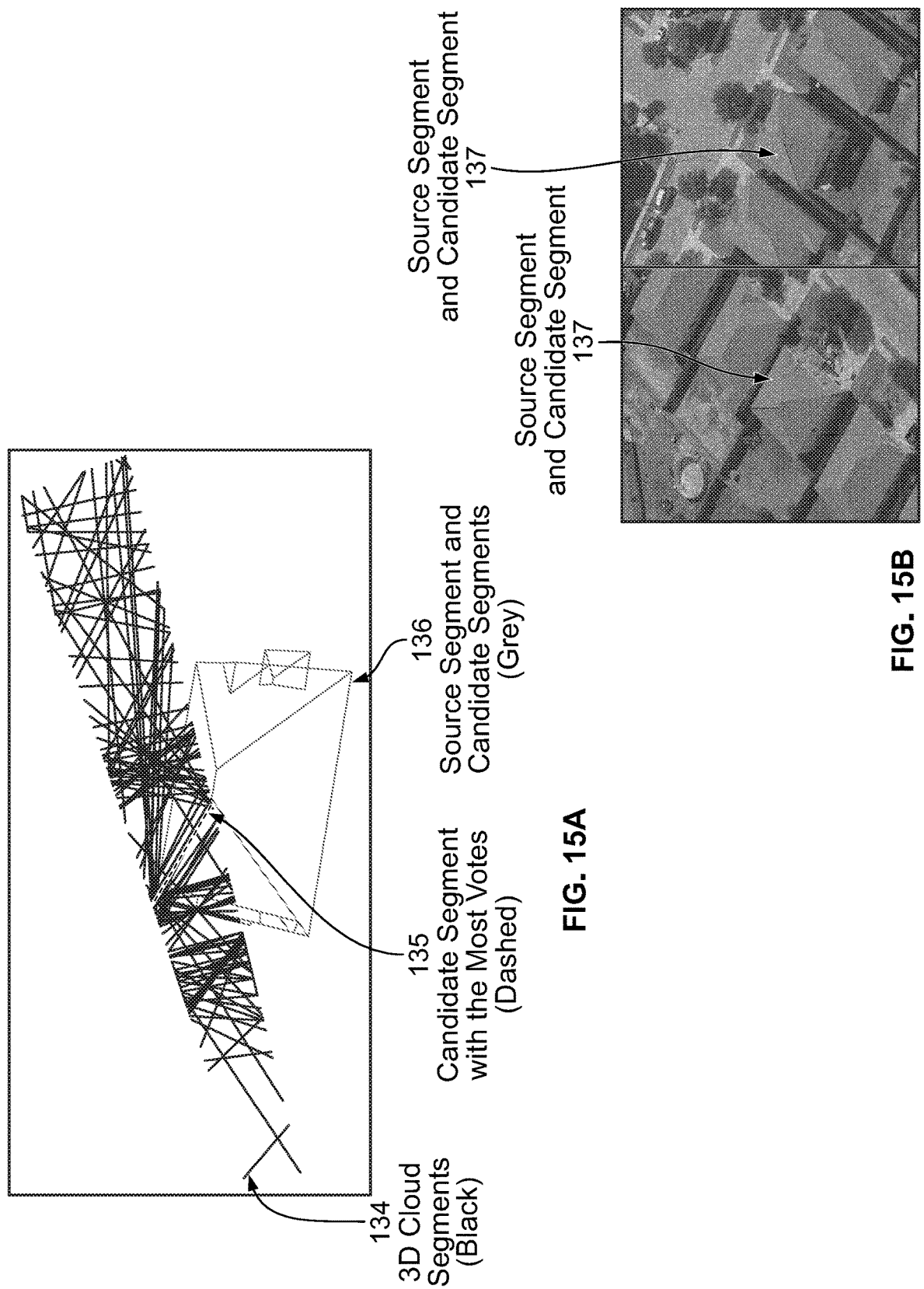
FIGS. 15A-15B are diagrams illustrating a sample-consensus-based approach capable of being implemented by the system.

FIG. 15A illustrates operation of the sample-consensus-based process described in FIG. 14. Specifically, the 3D cloud segments 134 are presented in light grey and a ground truth model 136 is presented in dark grey. FIG. 15B illustrates the source segment and the candidate segment 137 (presented in dark grey). The source segment and the candidate segment 137 are used to generate a candidate 3D segment 135 (presented in white in FIG. 15A), which receives a vote.

Figure 16A:
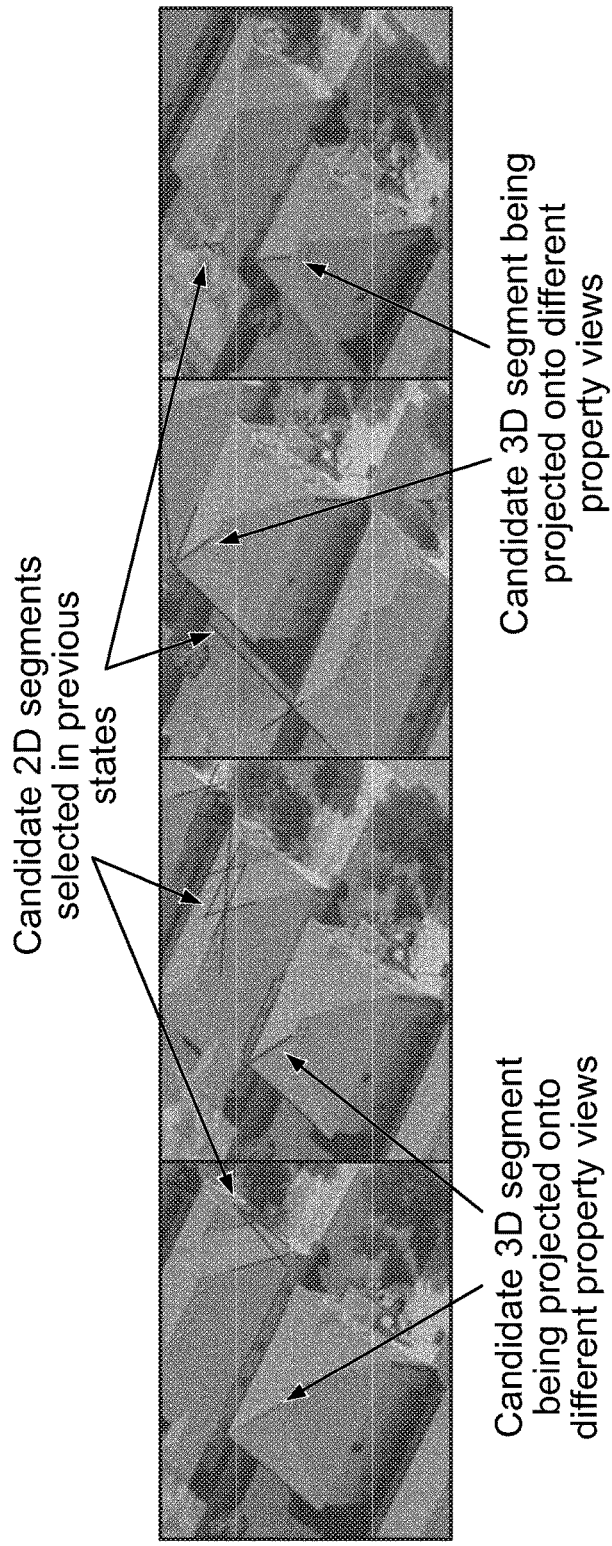
FIGS. 16A-16B are screenshots illustrating candidate 3D segments identified by the system on different views and a coarse 3D segment cloud generated by the system.

FIG. 16A illustrates a candidate 3D segment identified by the system and projected onto different views. If the projected candidate 3D segment matches a candidate 2D segment (that was selected in the previous stage), the system votes (from that view) for the candidate 3D segment.

Figure 16B:
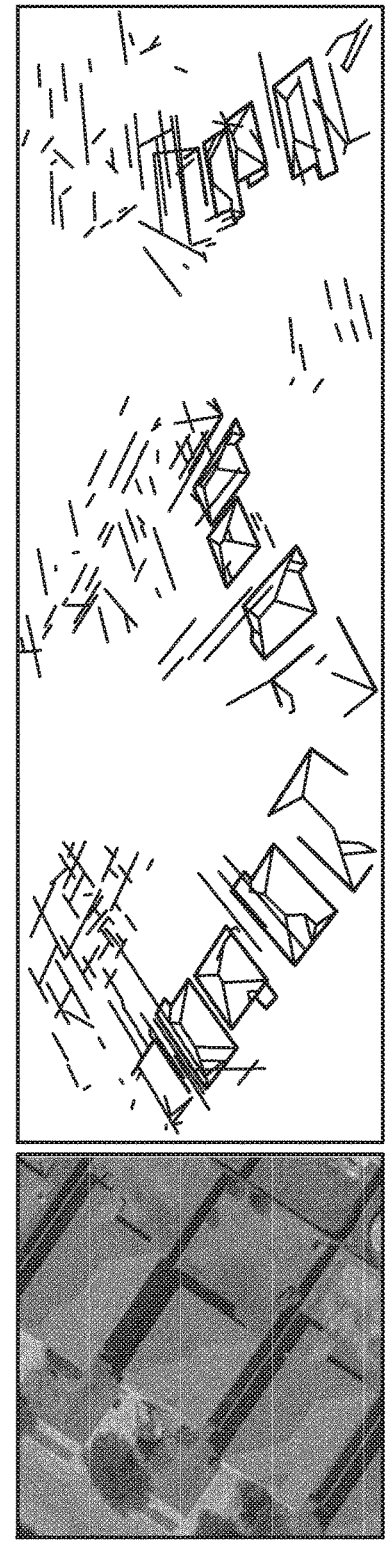

The process is repeated for every candidate 3D segment. The candidate 3D segments with the most votes are selected. FIG. 16B shows the result of this process. Specifically, FIG. 16B shows a coarse 3D segment cloud. The coarse 3D segment cloud may be cleaned and filtered by an outlier removal process to be discussed in FIG. 17, below.

Figure 17:
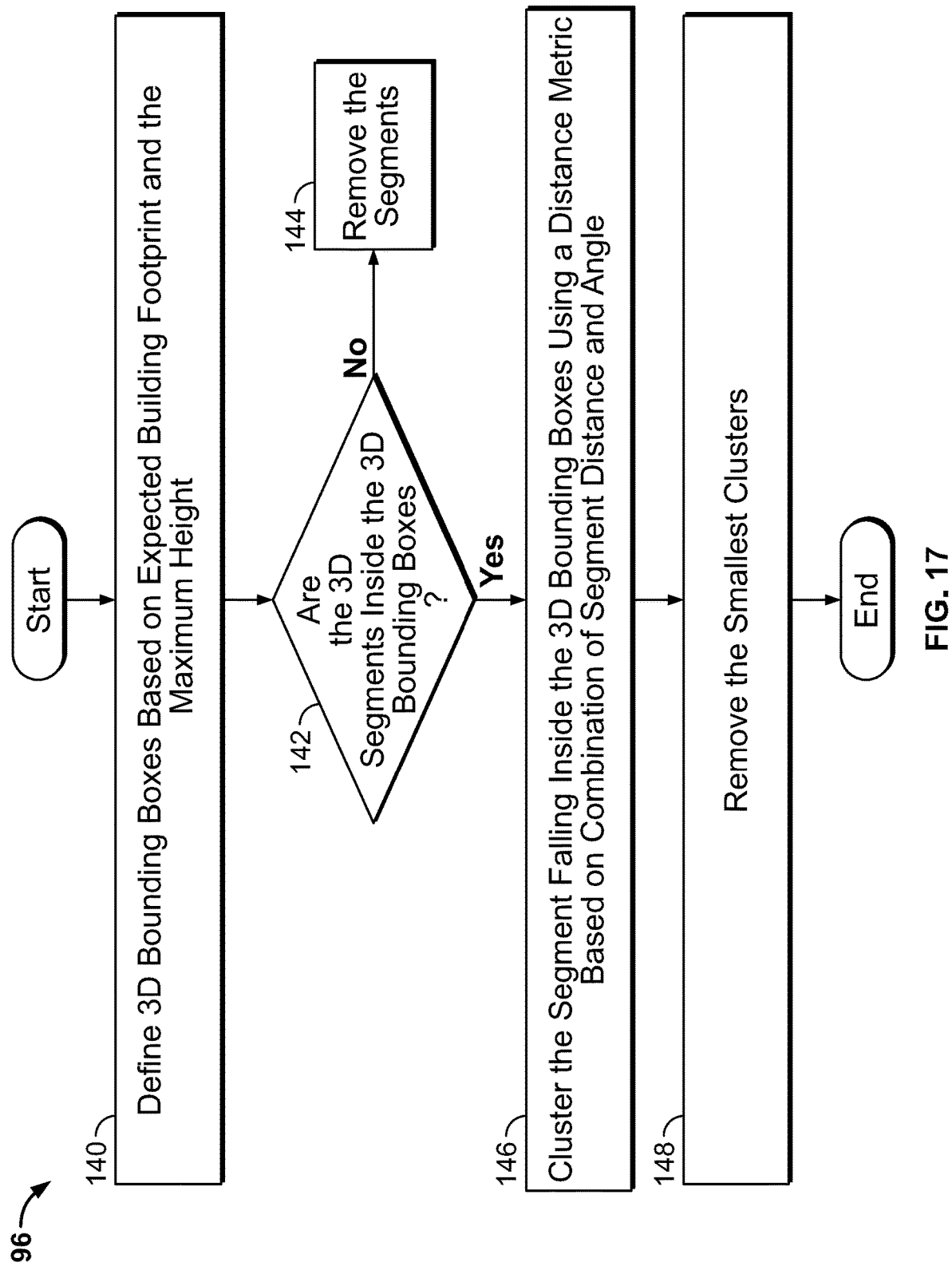
FIG. 17 is a flowchart illustrating step 96 of FIG. 11 in greater detail.
Figure 18:
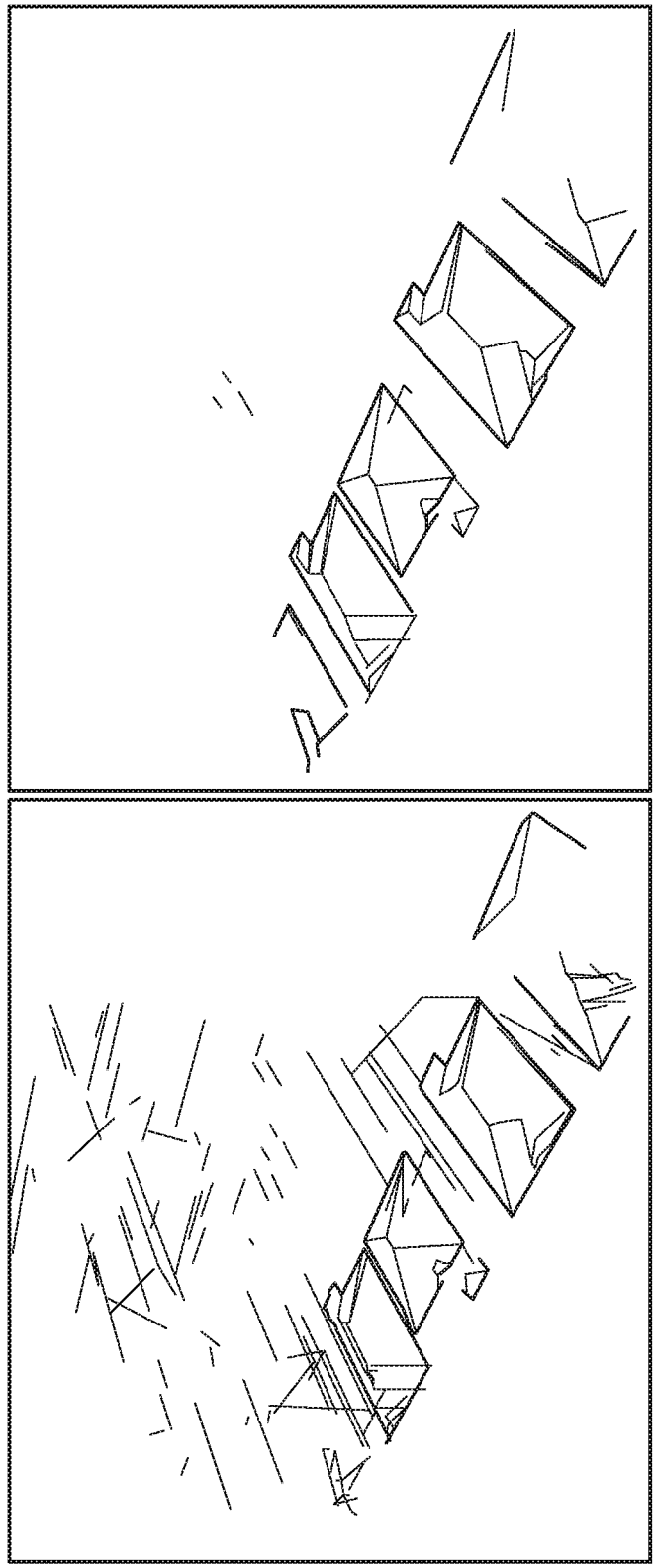
FIG. 18 is a diagram illustrating an outlier removal process carried out by the system.

FIG. 17 is a flowchart illustrating step 96 of FIG. 11 in greater detail, wherein outliers are removed by the system. In step 140, the outlier removal process 96 defines 3D bounding boxes based on an expected building footprint and a maximum height. In step 142, the outlier removal process 96 determines whether the 3D segments are inside the 3D bounding boxes. When the 3D segments are outside the 3D bounding boxes, then the outlier removal process 96 removes the 3D segments in step 144. When the 3D segments are inside the 3D bounding boxes, then the outlier removal process 96 can, in step 146, cluster the 3D segment inside the 3D bounding boxes using a distance metric based on a combination of a distance and an angle of the 3D segment. In step 148, outlier removal process 96 removes the smallest clusters. For example, the smaller clusters may be removed based on a predetermined amount, a percentage based amount, a threshold amount, etc. An illustration of the outlier removal process 96 can be seen in FIG. 18.

Figure 19:
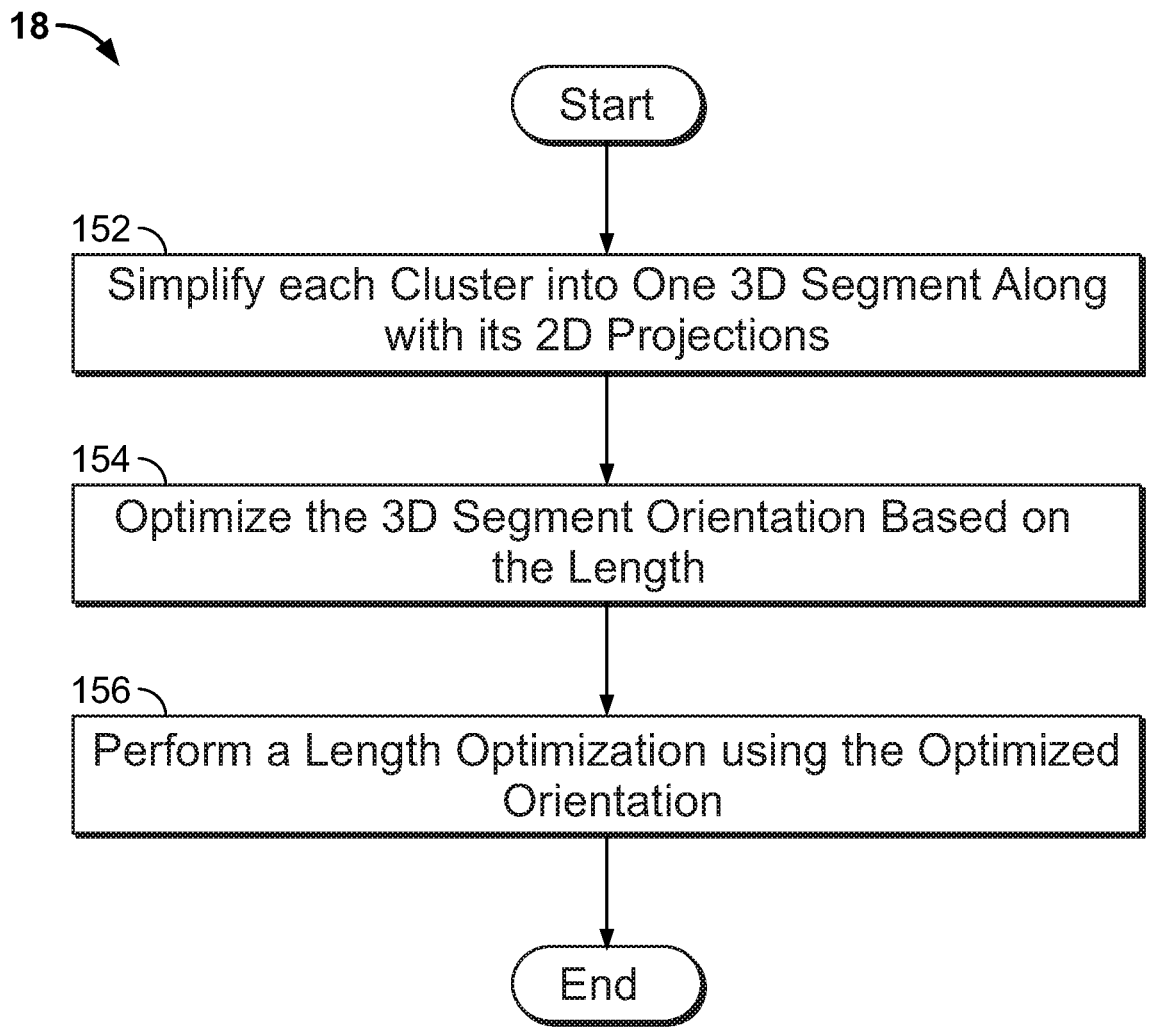
FIG. 19 is a flowchart illustrating step 18 of FIG. 1 in greater detail.
Figure 20A:
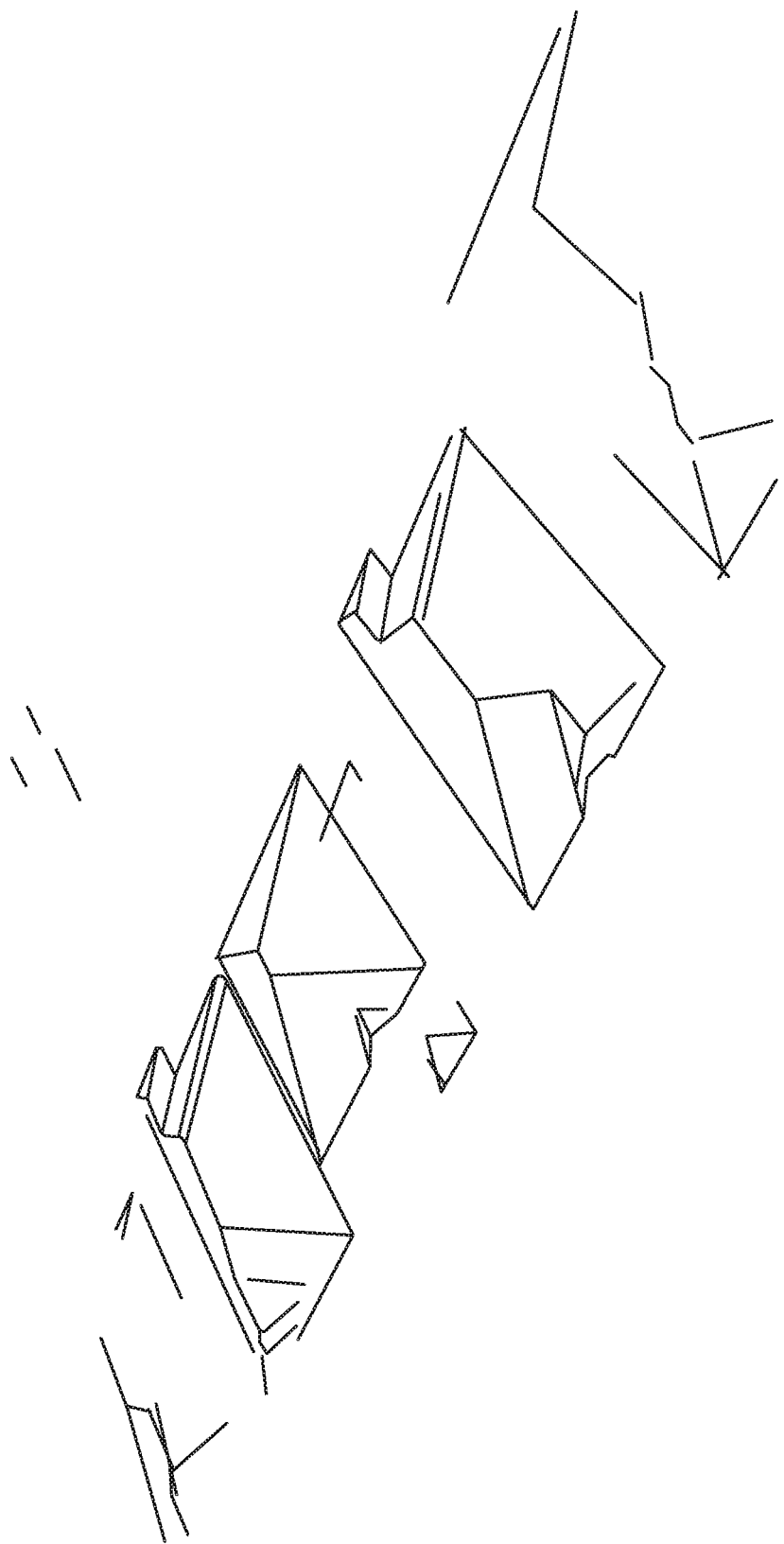
FIG. 20A is a diagram illustrating an optimized 3D wireframe generated by the system.
Figure 20B:
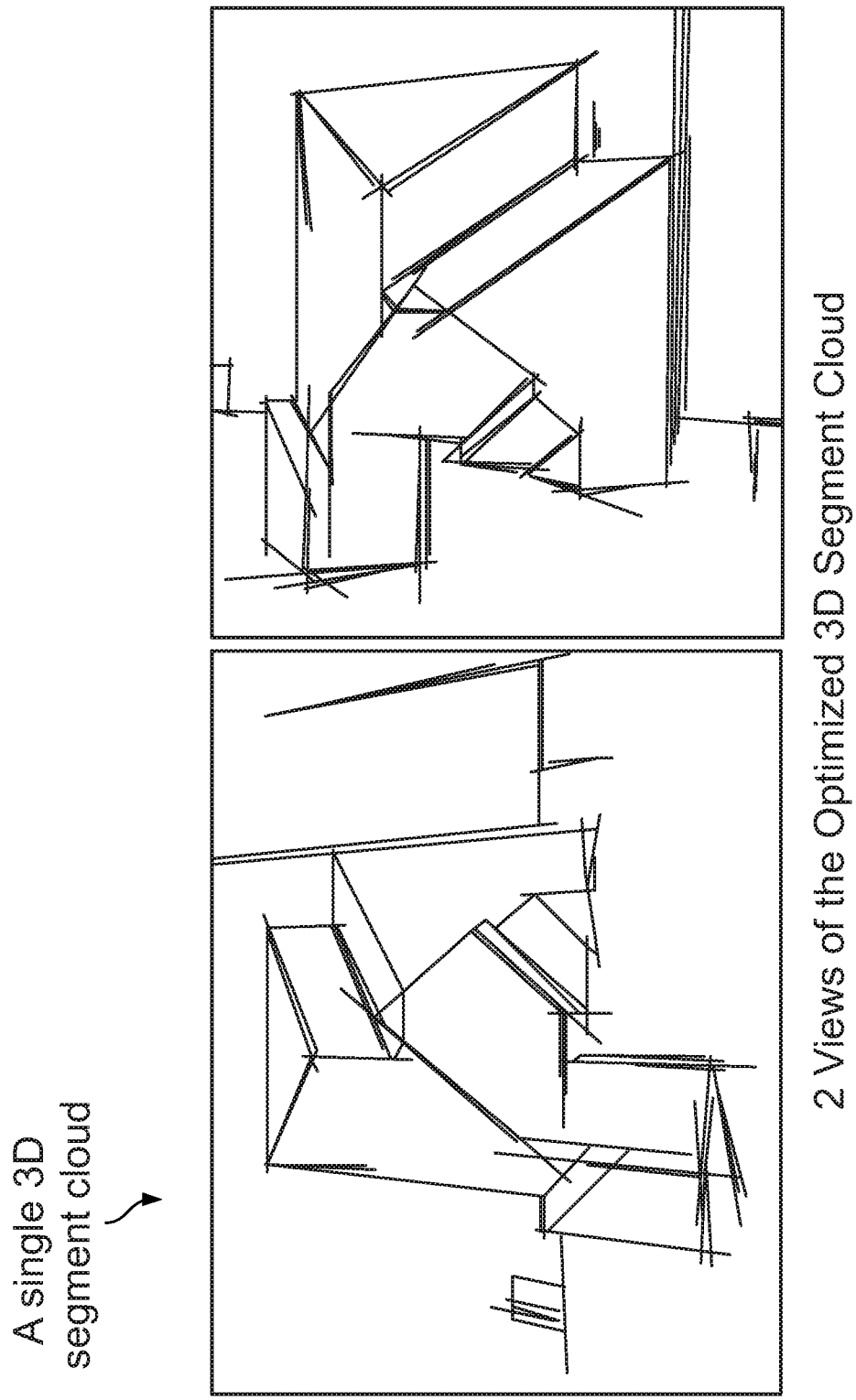
FIG. 20B is a diagram illustrating optimized 3D segment cloud generation by the system.

FIG. 19 is a flowchart illustrating step 18 of FIG. 1 in greater detail, wherein the system performs wireframe extraction and transformation processes to transform the 3D segment cloud into a wireframe representation of the 3D structure. It should be noted that one of the objectives of the wireframe extraction and transformation process 18 is to remove any redundant 3D segments. The wireframe extraction and transformation process 18 transforms the 3D segment cloud into a wireframe representation of the 3D structure. In step 152, the wireframe extraction and transformation process 18 simplifies each cluster of 3D segments (and their 2D projections) into one 3D segment. For each cluster, a representative 3D segment can be chosen. The representative 3D segment can also be fused with all of the segment observations such that the best candidate for each cluster may be characterized by the number of 3D segments in the same cluster. This cluster may be referred to as a simplified segment cloud. In step 154, the wireframe extraction and transformation process 18 optimizes an orientation of the 3D segment by maintaining the same length. In step 156, the wireframe extraction and transformation process 18 performs a length optimization by using the optimized orientation from step 154. The optimized 3D wireframe is illustrated in FIG. 20A. FIG. 20B illustrates an optimized 3D segment cloud.

Figure 21:
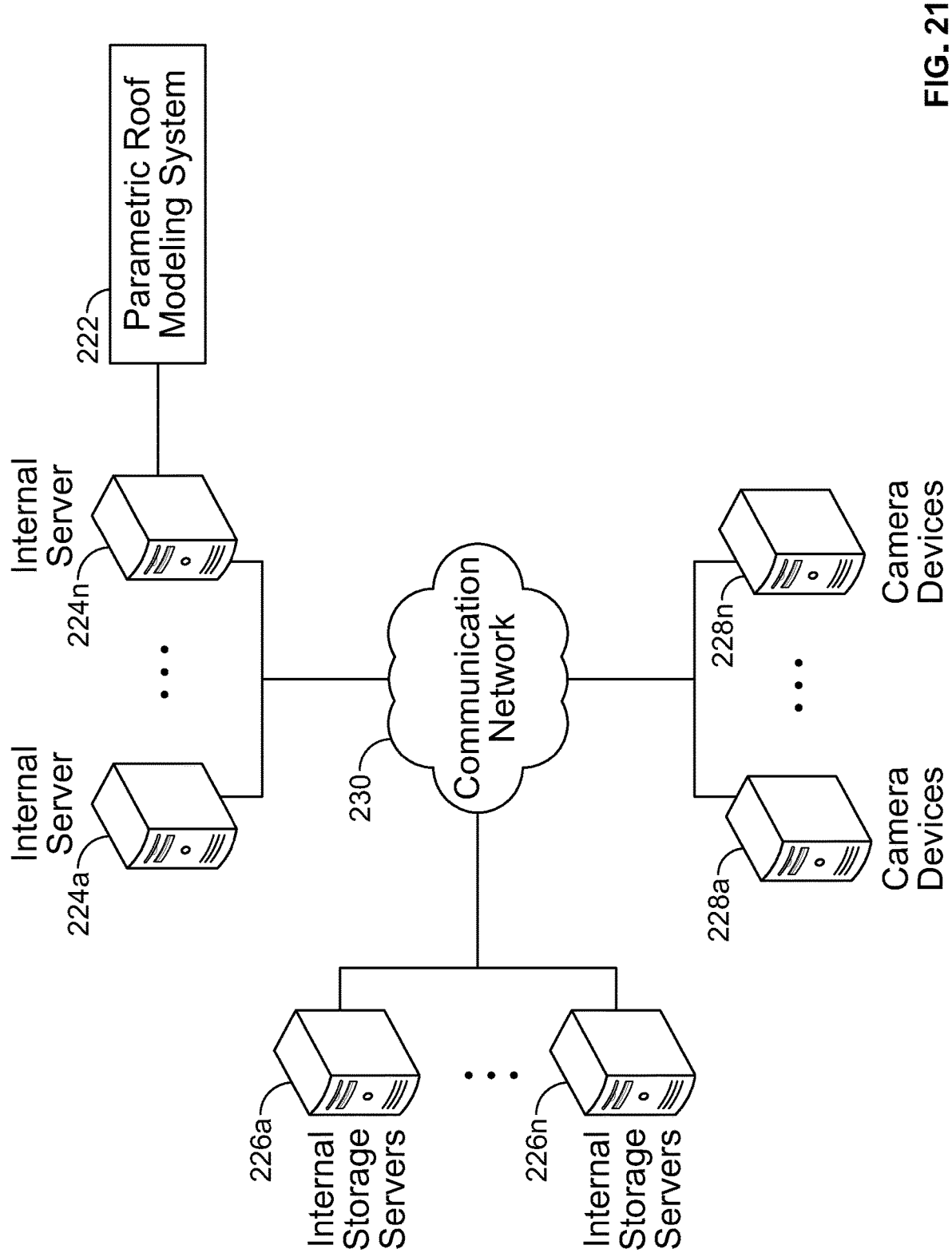
FIG. 21 is a diagram illustrating sample hardware components on which the system of the present disclosure could be implemented.

FIG. 21 is a diagram illustrating computer hardware and network components on which the system of the present disclosure could be implemented. The system can include a plurality of internal servers 224a-224n having at least one processor and memory for executing the computer instructions and methods described above (which could be embodied as computer software 222 illustrated in the diagram). The system can also include a plurality of image storage servers 226a-226n for receiving the image data and video data. The system can also include a plurality of camera devices 228a-228n for capturing image data and video data. These systems can communicate over a communication network 230. The 3D segment determination system or engine can be stored on the internal servers 224a-224n or on an external server(s). Of course, the system of the present disclosure need not be implemented on multiple devices, and indeed, the system could be implemented on a single computer system (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed:

1. A system for modeling a three-dimensional structure utilizing two-dimensional segments comprising:
   a memory; and
   a processor in communication with the memory, the processor:
      extracting a plurality of two-dimensional segments corresponding to the three-dimensional structure from a plurality of images indicative of different views of the three-dimensional structure;
      determining a plurality of three-dimensional candidate segments based on the extracted plurality of two-dimensional segments;
      adding the plurality of three-dimensional candidate segments to a three-dimensional segment cloud;
      removing outlier segments from the three-dimensional segment cloud that are located outside of a three-dimensional bounding box that is based on an expected building footprint and a maximum height; and
      transforming the three-dimensional segment cloud into a wireframe indicative of the three-dimensional structure by performing a wireframe extraction process on the three-dimensional segment cloud, the wireframe extraction process identifying clusters of three-dimensional candidate segments from the plurality of three-dimensional candidate segments in the three-dimensional cloud, processing each cluster into a three-dimensional line segment corresponding to a respective cluster, and optimizing an orientation of each three-dimensional line segment corresponding to the respective cluster.

2. The system of claim 1, wherein the processor:
   captures the plurality of images from different camera viewpoints;
   determines a projection plane, camera parameter sets, and image parameters associated with each image of the plurality of images; and
   identifies, based on the projection plane, the camera parameter sets, and the image parameters, two-dimensional segments sets in each image of the plurality of images corresponding to edges of the three-dimensional structure.

3. The system of claim 1, wherein the processor determines the plurality of three-dimensional candidate segments based on the plurality of two-dimensional segments by determining a plurality of ground three-dimensional segments, determining a plurality of horizontal three-dimensional segments, and determining a plurality of oblique three-dimensional segments.

4. The system of claim 3, wherein the processor determines the plurality of ground three-dimensional segments by:
   pairing each extracted two-dimensional segment with proximate extracted two-dimensional segments;
   selecting parallel two-dimensional segment pairs;
   determining a three-dimensional segment from each selected parallel two-dimensional segment pair; and
   selecting ground three-dimensional segments from the determined three-dimensional segments.

5. The system of claim 3, wherein the processor determines the plurality of horizontal three-dimensional segments by:
   pairing each extracted two-dimensional segment with parallel extracted two-dimensional segments;
   determining a three-dimensional segment from each two-dimensional segment pair;
   compiling the determined three-dimensional segments, based on characteristics thereof, into a plurality of clusters; and
   selecting at least one cluster from the plurality of clusters and determining a horizontal three-dimensional segment indicative of the selected cluster.

6. The system of claim 3, wherein the processor determines the plurality of oblique three-dimensional segments by:
   pairing each extracted two-dimensional segment with non-parallel extracted two-dimensional segments;
   determining a three-dimensional segment from each two-dimensional segment pair;
   compiling the determined three-dimensional segments, based on characteristics thereof, into a plurality of clusters; and
   selecting at least one cluster from the plurality of clusters and determining an oblique three-dimensional segment indicative of the selected cluster.

7. The system of claim 1, wherein the processor determines the plurality of three-dimensional segments based on the extracted plurality of two-dimensional segments by determining a plurality of epipolar three-dimensional segments, the processor:
   pairing extracted two-dimensional segments in other views with compatible epipolar lines, the epipolar lines reducing comparisons between extracted two-dimensional segments;
   determining a three-dimensional segment from each two-dimensional segment pair;
   selecting three-dimensional segment pairs having a consensus above a predetermined threshold value; and
   excluding outlier three-dimensional segment pairs.

8. A method for modeling a three-dimensional structure utilizing two-dimensional segments comprising the steps of:
extracting a plurality of two-dimensional segments corresponding to the three-dimensional structure from a plurality of images indicative of different views of the three-dimensional structure;
determining a plurality of three-dimensional candidate segments based on the extracted plurality of two-dimensional segments;
adding the plurality of three-dimensional candidate segments to a three-dimensional segment cloud;
removing outlier segments from the three-dimensional segment cloud that are located outside of a three-dimensional bounding box that is based on an expected building footprint and a maximum height; and
transforming the three-dimensional segment cloud into a wireframe indicative of the three-dimensional structure by performing a wireframe extraction process on the three-dimensional segment cloud, the wireframe extraction process identifying clusters of three-dimensional candidate segments in the three-dimensional cloud, processing each cluster into a three-dimensional line segment corresponding to respective cluster, and optimizing an orientation of each three-dimensional line segment corresponding to the respective cluster.

9. The method of claim 8, further comprising:
captures the plurality of images from different camera viewpoints;
determining a projection plane, camera parameter sets, and image parameters associated with each image of the plurality of images; and
identifying, based on the projection plane, the camera parameter sets, and the image parameters, the two-dimensional segments sets in each image of the plurality of images corresponding to edges of the three-dimensional structure.

10. The method of claim 8, further comprising determining a plurality of ground three-dimensional segments, determining a plurality of horizontal three-dimensional segments, and determining a plurality of oblique three-dimensional segments.

11. The method of claim 10, further comprising determining the plurality of ground three-dimensional segments by:
pairing each extracted two-dimensional segment with proximate extracted two-dimensional segments;
selecting parallel two-dimensional segment pairs;
determining a three-dimensional segment from each selected parallel two-dimensional segment pair; and
selecting ground three-dimensional segments from among the determined three-dimensional segments.

12. The method of claim 10, further comprising determining the plurality of horizontal three-dimensional segments by:
pairing each extracted two-dimensional segment with parallel extracted two-dimensional segments;
determining a three-dimensional segment from each two-dimensional segment pair;
compiling the determined three-dimensional segments, based on characteristics thereof, into a plurality of clusters; and
selecting at least one cluster from the plurality of clusters and determining a horizontal three-dimensional segment indicative of the selected cluster.

13. The method of claim 10, further comprising determining the plurality of oblique three-dimensional segments by:
pairing each extracted two-dimensional segment with non-parallel extracted two-dimensional segments;
determining a three-dimensional segment from each two-dimensional segment pair;
compiling the determined three-dimensional segments, based on characteristics thereof, into a plurality of clusters; and
selecting at least one cluster from the plurality of clusters and determining an oblique three-dimensional segment indicative of the selected cluster.

14. The method of claim 8, further comprising determining a plurality of epipolar three-dimensional segments by:
pairing extracted two-dimensional segments in other views with compatible epipolar lines, the epipolar lines reducing comparisons between extracted two-dimensional segments;
determining a three-dimensional segment from each two-dimensional segment pair;
selecting three-dimensional segment pairs having a consensus above a predetermined threshold value; and
excluding outlier three-dimensional segment pairs.

15. A non-transitory computer readable medium having instructions stored thereon for modeling a three-dimensional structure utilizing two-dimensional segments which, when executed by a processor, causes the processor to carry out the steps of:
extracting a plurality of two-dimensional segments corresponding to the three-dimensional structure from a plurality of images indicative of different views of the three-dimensional structure;
determining a plurality of three-dimensional candidate segments based on the extracted plurality of two-dimensional segments;
adding the plurality of three-dimensional candidate segments to a three-dimensional segment cloud;
removing outlier segments from the three-dimensional segment cloud that are located outside of a three-dimensional bounding box that is based on an expected building footprint and a maximum height; and
transforming the three-dimensional segment cloud into a wireframe indicative of the three-dimensional structure by performing a wireframe extraction process on the three-dimensional segment cloud the wireframe extraction process identifying clusters of three-dimensional candidate segments in the three-dimensional cloud, processing each cluster into a three-dimensional line segment corresponding to respective cluster, and optimizing an orientation of each three-dimensional line segment corresponding to the respective cluster.

16. The non-transitory computer readable medium of claim 15, the processor further carrying out the steps of:
capturing the plurality of images from different camera viewpoints;
determining a projection plane, camera parameter sets, and image parameters associated with each image of the plurality of images; and
identifying, based on the projection plane, the camera parameter sets and the image parameters, the two-dimensional segments sets in each image of the plurality of images corresponding to edges of the three-dimensional structure.

17. The non-transitory computer readable medium of claim 15, the processor further carrying out the steps of determining a plurality of ground three-dimensional segments, determining a plurality of horizontal three-dimensional segments, and determining a plurality of oblique three-dimensional segments.

18. The non-transitory computer readable medium of claim 17, the processor determining the plurality of ground three-dimensional segments by carrying out the steps of:
pairing each extracted two-dimensional segment with proximate extracted two-dimensional segments;
selecting parallel two-dimensional segment pairs;
determining a three-dimensional segment from each selected parallel two-dimensional segment pair; and
selecting ground three-dimensional segments from the determined three-dimensional segments.

19. The non-transitory computer readable medium of claim 17, the processor determining the plurality of horizontal three-dimensional segments by carrying out the steps of:
pairing each extracted two-dimensional segment with parallel extracted two-dimensional segments;
determining a three-dimensional segment from each two-dimensional segment pair;
compiling the determined three-dimensional segments, based on characteristics thereof, into a plurality of clusters; and
selecting at least one cluster from the plurality of clusters and determining a horizontal three-dimensional segment indicative of the selected cluster.

20. The non-transitory computer readable medium of claim 17, the processor determining the plurality of oblique three-dimensional segments by carrying out the steps of:
pairing each extracted two-dimensional segment with non-parallel extracted two-dimensional segments;
determining a three-dimensional segment from each two-dimensional segment pair;
compiling the determined three-dimensional segments, based on characteristics thereof, into a plurality of clusters; and
selecting at least one cluster from the plurality of clusters and determining an oblique three-dimensional segment indicative of the selected cluster.

21. The non-transitory computer readable medium of claim 15, the processor determining a plurality of epipolar three-dimensional segments by carrying out the steps of:
pairing extracted two-dimensional segments in other views with compatible epipolar lines, the epipolar lines reducing comparisons between extracted two-dimensional segments;
determining a three-dimensional segment from each two-dimensional segment pair;
selecting three-dimensional segment pairs having a consensus above a predetermined threshold value; and
excluding outlier three-dimensional segment pairs.

* * * * *